(12) United States Patent
Priyanto et al.

(10) Patent No.: US 11,418,917 B2
(45) Date of Patent: Aug. 16, 2022

(54) TDOA POSITIONING OF MOBILE DEVICES

(71) Applicants: Sony Mobile Communications Inc., Tokyo (JP); Sony Corporation, Tokyo (JP)

(72) Inventors: Basuki Priyanto, Lund (SE); Shin Horng Wong, Weybridge (GB); Martin Beale, Weybridge (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/323,717

(22) PCT Filed: Aug. 11, 2016

(86) PCT No.: PCT/EP2016/069129
§ 371 (c)(1),
(2) Date: Feb. 6, 2019

(87) PCT Pub. No.: WO2018/028787
PCT Pub. Date: Feb. 15, 2018

(65) Prior Publication Data
US 2019/0182629 A1    Jun. 13, 2019

(51) Int. Cl.
*H04W 4/029* (2018.01)
*H04W 64/00* (2009.01)
(Continued)

(52) U.S. Cl.
CPC ............. *H04W 4/029* (2018.02); *G01S 1/045* (2013.01); *G01S 1/20* (2013.01); *G01S 5/0221* (2013.01); *G01S 5/10* (2013.01); *H04W 64/003* (2013.01)

(58) Field of Classification Search
CPC ......... H04W 4/029; H04W 4/02; H04W 4/04; H04W 4/043; H04W 4/046;
(Continued)

(56) References Cited

U.S. PATENT DOCUMENTS

| 2010/0317343 A1 | 12/2010 | Krishnamurthy et al. |
| 2011/0081933 A1 | 4/2011 | Suh |

(Continued)

FOREIGN PATENT DOCUMENTS

| KR | 1020130115321 A | 10/2013 |
| WO | 2010124448 A1 | 11/2010 |

(Continued)

OTHER PUBLICATIONS

International Search Report and Written Opinion from counterpart International Patent Application No. PCT/EP2016/069130 dated Apr. 18, 2017, 12 pages.

(Continued)

*Primary Examiner* — Dinh Nguyen
(74) *Attorney, Agent, or Firm* — Tucker Ellis LLP

(57) ABSTRACT

A device receives, in a first sequence (501) of transmission frames (202) of a wireless channel, first positioning reference signals (151, 152) from a first base station. The device receives, in a second sequence (502) of transmission frames (202) which is at least partly different from the first sequence (501), second positioning reference signals (153, 154) from a second base station. A time-difference of arrival (TDOA) is determined based on the first positioning reference signals (151, 152) and the second positioning reference signals (153, 154).

14 Claims, 15 Drawing Sheets

(51) Int. Cl.
*G01S 1/20* (2006.01)
*G01S 1/04* (2006.01)
*G01S 5/02* (2010.01)
*G01S 5/10* (2006.01)

(58) Field of Classification Search
CPC ....... H04W 64/003; H04W 64/00; G01S 5/10; G01S 1/045; G01S 1/20; G01S 5/0221; G01S 5/0063; G01S 5/08
See application file for complete search history.

(56) References Cited

U.S. PATENT DOCUMENTS

| | | |
|---|---|---|
| 2012/0040696 A1 | 2/2012 | Siomina |
| 2012/0195286 A1 | 8/2012 | Kim |
| 2014/0112261 A1 | 4/2014 | Chen |
| 2014/0176366 A1* | 6/2014 | Fischer ............... H04W 64/006 342/374 |
| 2015/0215729 A1 | 7/2015 | Opshaug |
| 2015/0296359 A1* | 10/2015 | Edge ................... H04W 4/02 455/404.2 |
| 2016/0050534 A1 | 2/2016 | Lim et al. |
| 2018/0035251 A1 | 2/2018 | Bitra |
| 2018/0098187 A1* | 4/2018 | Blankenship ............. G01S 5/02 |
| 2019/0007932 A1 | 1/2019 | Chen et al. |

FOREIGN PATENT DOCUMENTS

| | | |
|---|---|---|
| WO | 2010126419 A1 | 11/2010 |
| WO | 2012044232 A2 | 4/2012 |
| WO | 2012081861 A2 | 6/2012 |
| WO | 2015199392 A1 | 12/2015 |

OTHER PUBLICATIONS

International Search Report and Written Opinion from counterpart International Patent Application No. PCT/EP2016/069129 dated May 30, 2017, 12 pages.
3GPP; Technical Specification Group Radio Access Network; Evolved Universal Terrestrial Radio Access; Physical channels and modulation; Technical Specification: 36.211, V13.2.0 (Jun. 2016), Chapter 6.10.4; 4 pages.
3GPP; Technical Specification Group Radio Access Network; Evolved Universal Terrestrial Radio Access; LTE Positioning Protocol; Technical Specification: 36.355, V13.1.0 (Mar. 2016), Chapter 6.5.1; 11 pages.
3GPP; Technical Specification Group Radio Access Network; Evolved Universal Terrestrial Radio Access; LTE Positioning Protocol A; Technical Specification: 36.455, V13.1.0 (Mar. 2016), Chapter 8.2.5; 3 pages.
Notice of Allowance from corresponding Japanese Application No. 2019-507342 dated Aug. 31, 2021.

* cited by examiner

FIG. 17

Communicating a control message indicative of a first sequence of transmission frames and a second sequence of transmission frames — 6011

TDOA POSITIONING OF MOBILE DEVICES

TECHNICAL FIELD

Various examples relate to positioning of mobile devices. In particular, various examples relate to positioning of mobile devices based on communication of positioning reference signals via a wireless channel comprising transmission frames.

BACKGROUND

Positioning techniques for mobile devices are applied in various fields of technology. Sometimes, positioning techniques are combined with wireless communication. In this context, a particular technique is the Observed Time Difference Of Arrival (OTDOA). Here, downlink (DL) positioning reference signals are transmitted by a plurality of base stations and received by a mobile device. The mobile device can then determine the time-difference of arrival (TDOA), sometimes also referred to as Reference Signal Time Difference (RSTD). The TDOA can thus correspond to the observed time difference between the positioning reference signals received from a target base station and the reference base station. In some examples, it is possible that the mobile device determines the TDOA for two or more base stations: this then typically involves three or more base stations, because one base station is used as the reference.

Then, based on the TDOA, location information for the mobile device can be calculated. The location information may be indicative of the position of the mobile device. For determining the location information, the predefined locations of the base stations involved and/or predefined time offsets between the involved base stations can be considered. In some examples, a location server may determine the location information based on triangulation.
OTDOA techniques are described in the Third Generation Partnership Project (3GPP) Technical Specification (TS) 36.211 V 13.2.0 (2016-06), chapter 6.10.4., TS 36.355 V 13.1.0 (2016-03) chapter 6.5.1., as well as TS 36.455 V 13.1.0 (2016-03) chapter 8.2.5.

However, such OTDOA positioning techniques according to reference implementations face certain drawbacks and restrictions. For example, the accuracy of such positioning techniques may be limited. For example, the energy consumption for receiving and processing the positioning reference signals can be significant.

SUMMARY

Therefore, a need exists for advanced positioning techniques for mobile devices. In particular, a need exists for such techniques which overcome or mitigate at least some of the above identified drawbacks and restrictions.

According to an example, a device comprises an interface configured to communicate on a wireless channel. The device further comprises at least one processor. The at least one processor is configured to receive first positioning reference signals from a first base station in a first sequence of transmission frames of the wireless channel. The at least one processor is further configured to receive second positioning reference signals from a second base station in a second sequence of transmission frames which is at least partly different from the first sequence. The at least one processor is further configured to determine a time-difference of arrival of signals communicated on the wireless channel based on the first positioning reference signals and the second positioning reference signals.

According to an example, a network node comprises an interface configured to communicate with a plurality of base stations. The network node comprises at least one processor configured to communicate at least one control message to the first base station of the plurality of base stations and to a second base station of the plurality of base stations. The at least one control message is indicative of the first sequence of transmission frames of the wireless channel in which the first base station is to transmit first positioning reference signals to a device. The at least one control message is further indicative of a second sequence of transmission frames of the wireless channel in which the second base station is to transmit second positioning reference signals to the device. The timing of the first sequence with respect to the second sequence facilitates determining of the time-difference of arrival of signals communicated on the wireless channel based on the first positioning reference signals and the second positioning reference signals.

According to an example, a method comprises receiving first positioning reference signals from a first base station in a first sequence of transmission frames. The method further comprises receiving second positioning reference signals from a second base station in a second sequence of transmission frames. The second sequence of transmission frames is at least partly different from the first sequence. The method further comprises determining at time-difference of arrival of signals communicated on the wireless channel based on the first positioning reference signals and the second positioning reference signals.

According to an example, a computer program product includes program code. The program code can be executed by at least one processor. Executing the program code by the at least one processor causes the at least one processor to perform a method. The method comprises receiving first positioning reference signals from a first base station in a first sequence of transmission frames. The method further comprises receiving second positioning reference signals from a second base station in a second sequence of transmission frames. The second sequence of transmission frames is at least partly different from the first sequence. The method further comprises determining at time-difference of arrival of signals communicated on the wireless channel based on the first positioning reference signals and the second positioning reference signals.

According to an example, a computer program includes program code. The program code can be executed by at least one processor. Executing the program code by the at least one processor causes the at least one processor to perform a method. The method receiving first positioning reference signals from a first base station in a first sequence of transmission frames. The method further comprises receiving second positioning reference signals from a second base station in a second sequence of transmission frames. The second sequence of transmission frames is at least partly different from the first sequence. The method further comprises determining at time-difference of arrival of signals communicated on the wireless channel based on the first positioning reference signals and the second positioning reference signals.

According to an example, a method comprises communicating at least one control message. The at least one control message is indicative of the first sequence of transmission frames of a wireless channel in which the first base station is to transmit first positioning reference signals to a device. The at least one control message is further indicative of a second sequence of transmission frames of the wireless channel in which the second base station is to transmit second positioning reference signals to the device. The timing of the first sequence with respect to the second sequence facilitates determining of a time-difference of arrival of signals communicated on the wireless channel based on the first positioning reference signals and the second positioning reference signals.

According to an example, a computer program product includes program code. The program code can be executed by at least one processor. Executing the program code by the at least one processor causes the at least one processor to perform a method. The method comprises communicating at least one control message. The at least one control message is indicative of the first sequence of transmission frames of a wireless channel in which the first base station is to transmit first positioning reference signals to a device. The at least one control message is further indicative of a second sequence of transmission frames of the wireless channel in which the second base station is to transmit second positioning reference signals to the device. The timing of the first sequence with respect to the second sequence facilitates determining of a time-difference of arrival of signals communicated on the wireless channel based on the first positioning reference signals and the second positioning reference signals.

According to an example, a computer program includes program code. The program code can be executed by at least one processor. Executing the program code by the at least one processor causes the at least one processor to perform a method. The method comprises communicating at least one control message. The at least one control message is indicative of the first sequence of transmission frames of a wireless channel in which the first base station is to transmit first positioning reference signals to a device. The at least one control message is further indicative of a second sequence of transmission frames of the wireless channel in which the second base station is to transmit second positioning reference signals to the device. The timing of the first sequence with respect to the second sequence facilitates determining of a time-difference of arrival of signals communicated on the wireless channel based on the first positioning reference signals and the second positioning reference signals.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 17 is a flowchart of a method according to various embodiments.

DETAILED DESCRIPTION OF EMBODIMENTS

Figure 1:
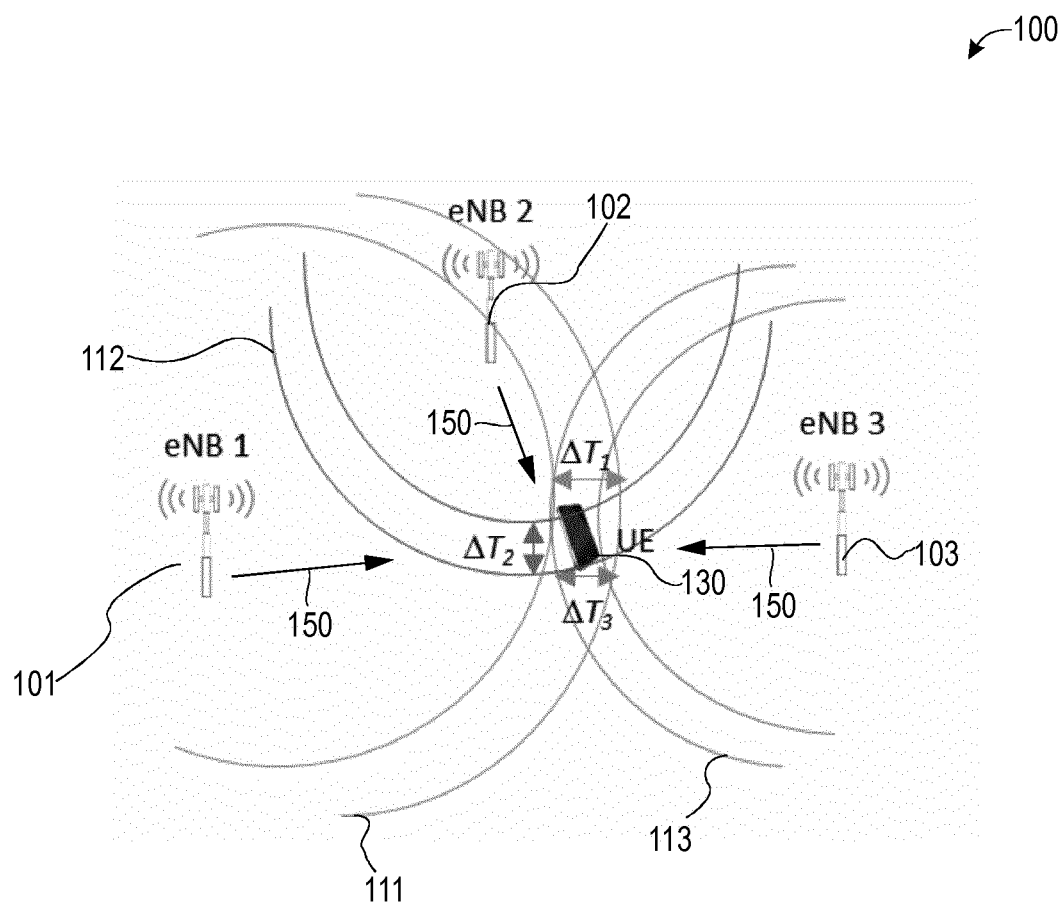
FIG. 1 schematically illustrates communication of DL positioning reference signals from a plurality of base stations of a cellular network to a mobile device according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, positioning techniques for mobile devices are described. The positioning techniques rely on the communication of positioning reference signals. In some examples, DL positioning reference signals are transmitted by one or more base stations (BSs) and received by a mobile device. While hereinafter the various examples are primarily described in the context of DL positioning reference signals, generally, such techniques may also be applied to uplink (UL) positioning reference signals.

The positioning techniques generally enable to track the position of the mobile device over the course of time. For this, location data indicative of the position of the mobile device may be determined. Based on the location data of the mobile device, position-dependent services can be implemented. Examples include geo-messaging, geo-tracking, etc.

In some examples, the positioning techniques described herein may be applied in the Internet of Things (IoT) framework. For example, this may correspond to the 3GPP Enhanced Machine-type Communication (eMTC) or the 3GPP Narrowband Internet of Things (NB-IoT) technology: These examples are described in 3GPP RP-161321 "New work item proposal on further enhanced MTC", Ericsson, RAN #72, and RP-161324 "New work item proposal: enhancements of NB-IOT", Vodafone, Huawei, HiSilicon, Ericsson, Qualcomm, RAN #72, respectively. Such techniques in the IoT framework typically aim at creating low-cost mobile devices that are power efficient and can operate in extended coverage, e.g., such as inside basements.

FIG. 1 illustrates aspects with respect to positioning techniques according to various examples. In particular, FIG. 1 illustrates aspects with respect to positioning techniques which rely on communication of DL positioning reference signals 150.

FIG. 1 illustrates the architecture of a cellular network 100 according to some examples implementations. In particular, the cellular network 100 according to the example of FIG. 1 implements the 3GPP LTE architecture. According to 3GPP LTE, a wireless channel is defined according to the evolved UMTS Terrestrial Radio Access (EUTRAN). Such illustration in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC systems and 3GPP New Radio (NR) positioning. Furthermore, respective techniques may be readily applied to various kinds of non-3GPP-specified architectures, such as Bluetooth, satellite communication, IEEE 802.11x Wi-Fi technology, etc.

In FIG. 1, a mobile device 130 (labeled UE in FIG. 1) can receive DL positioning reference signals 150 transmitted by each one of a plurality of BSs 101-103. In the 3GPP LTE architecture, the BSs 101-103 are implemented as evolved Node B's (eNBs). The positioning reference signals 150 transmitted by different BSs 101-103 may be orthogonal with respect to each other, e.g., in time-domain, frequency-domain, and/or code-domain. This mitigates interference.

To facilitate positioning of the mobile device 130, the mobile device 130 is typically time-synchronized with one or more of the BSs 101-103. E.g., the BSs 101-13 can be time-synchronized with one another; the serving BS 101-103 can be time-synchronized with the mobile device 130. Optionally, the BSs 101-103 are also time-synchronized with respect to each other.

The mobile device 130 may be one of the following: a smartphone; a cellular phone; a table; a notebook; a computer; a smart TV; a MTC device; an eMTC device; an IoT device; an NB-IoT device; etc.

FIG. 1 illustrates aspects with respect to the accuracy of determining the location of the mobile device 130. Typically, the accuracy of determining the location of the mobile device 130 depends on the accuracy of the measured positioning reference signals 150. For example, in FIG. 1, the determination of the time of arrival (TOA) 111 of the DL positioning reference signals 150 transmitted by the BS 101 has an accuracy of $\Delta T1$; the determination of the TOA 112 of the DL positioning reference signals 150 transmitted by the BS 102 has an accuracy of $\Delta T2$; and the determination of the TOA 113 of the DL positioning reference signals 150 transmitted by the BS 103 has an accuracy of $\Delta T3$. Typically, the accuracy of the TOA 111-113 measurements depends on the quality of the measured DL positioning reference signal and a bandwidth of the DL positioning reference signal.

Positioning reference signals may generally correspond to well-defined symbols transmitted via the wireless channel. The positioning reference signals may be encoded according to predefined rules. The positioning reference signals may have a well-defined amplitude and/or symbol value. Based on such well-defined properties of the positioning reference signals, it is possible to determine the TOA of the positioning reference signals. Various examples of positioning reference signals are conceivable. For example, in some examples, the positioning reference signals may be encoded based on a certain sequence code. In some examples, the sequence code may have a dependency on the time-frequency position of the particular resource used for transmission of the positioning reference signal 150 via the wireless channel. In some examples, the sequence code may have a dependency on an identity of the transmitting BS, e.g., a cell identifier (cell ID). Thereby, the positioning reference signals 150 may be indicative of the respective BSs. In some examples, the sequence code may have a dependency on the transmission frame which includes the resource allocated for transmission of the respective positioning reference signal 150: e.g., this may result in positioning reference signals 150 communicated in different transmission frames to be encoded differently. Thereby, the positioning reference signals may be indicative of the respective transmission frames. In some examples, the positioning reference signals may be scheduled specifically for a given mobile device 130. Different mobile devices may be associated with different positioning reference signals at different positioning occasions.

In some examples, the positioning reference signals employed according to the various examples described herein may employ the sequence code according to 3GPP TS 36.211 V 13.2.0 (2016-06), 6.10.4.1. In some examples, the positioning reference signals are employed according to the various examples described herein may employ the sequence code according to 3GPP TS 36.211 V 13.2.0 (2016-06), 6.10.10.1. In some examples, the positioning reference signals are employed according to the various examples described herein may employ the sequence code according to 3GPP TS 36.211 V 13.2.0 (2016-06), 6.11.2.1. In some examples, the positioning reference signals are employed according to the various examples described herein may employ the sequence code according to 3GPP TS 36.211 V 13.2.0 (2016-06), 6.11.1.1.

Figure 2:
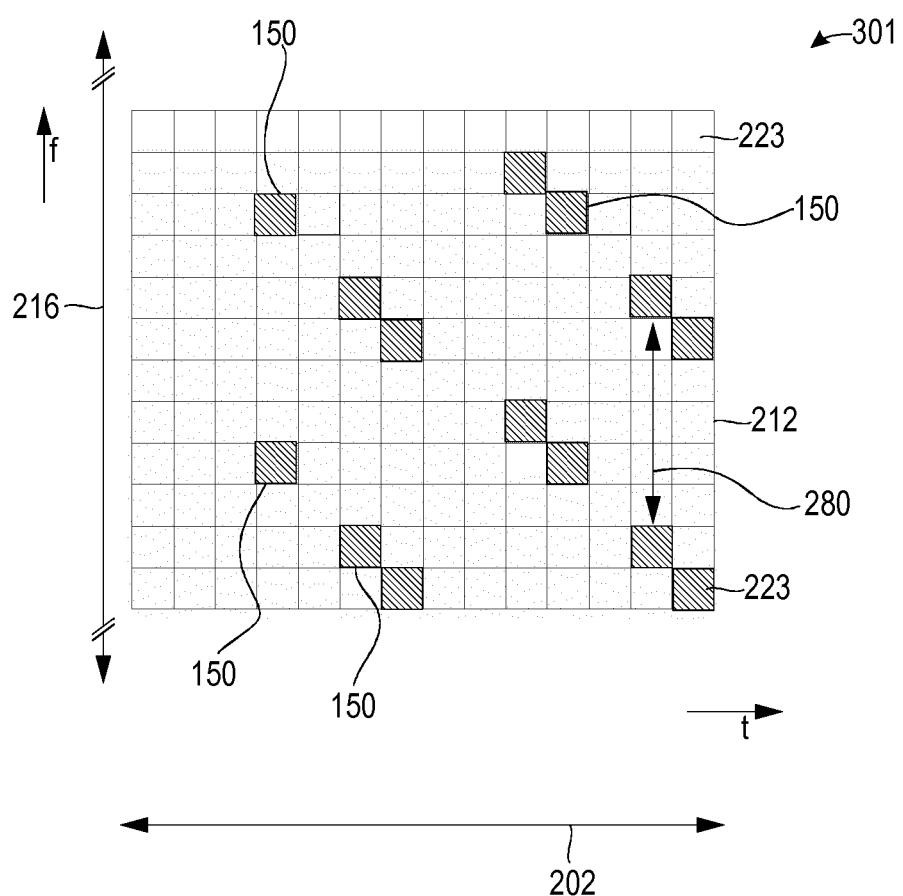
FIG. 2 schematically illustrates a resource mapping of a subframe of a wireless channel comprising a plurality of resources allocated for transmission of DL positioning reference signals according to various embodiments.

FIG. 2 illustrates aspects with respect to a resource mapping 301 of the wireless channel. FIG. 2 illustrates a resource mapping 301 used for transmission of DL positioning reference signals 150 from a given BS 101-103 to the mobile device 130.

The resource mapping 301 includes a plurality of time-frequency resources 223. The various resources 223 can be orthogonal with respect to each other. In an example, a resource 223 may relate to a symbol encoded by a Orthogonal Frequency Division Multiplexing (OFDM) subcarrier. Sometimes, a resource 223 may be referred to as a resource element. Each resource 223 may include a cyclic prefix.

The resource mapping 301 further defines some of the resources 223 to be allocated for transmission of the DL positioning reference signals 150 (in FIG. 2, the respective resources 223 are illustrated with the dashed filling). Other resources 223 are not allocated for transmission of the DL positioning reference signals 150: such resources 223 may be allocated for transmission of control data, payload data, other reference signals, etc. In some examples, it is also possible that resources 223 in the vicinity of positioning reference signals 150 do not carry data to mitigate interference. For example, other resources 223 may be used by other BSs for transmission of DL positioning reference signals 150.

The position of the respective resources 223 allocated for communication of a positioning reference signal 150 may be defined with respect to a subframe 202. The subframe 202 is a particular implementation of the transmission frame of the wireless channel. In other examples, the position of the respective resource 223 allocated to communication of a positioning reference signal 150 may, alternatively or additionally, be defined with respect to a frame comprising a plurality of subframes 202 and/or with respect to the time slot being part of a subframe. In an example implementation, the duration of the subframe 202 may be 1 millisecond. The subframe 202 may include two time slots, each of 0.5 milliseconds duration. The frame may include a plurality of subframes 202, e.g., a count of ten subframes 202.

In the example of FIG. 2, the position of the respective resource 223 allocated to the communication of the positioning reference signal 150 is, furthermore, defined with respect to a resource block 212. The resource block 212 includes a plurality of resources 223. Typically, the bandwidth of the wireless channel includes a plurality of resource blocks 212, e.g., two resource blocks, ten resource blocks, fifty resource blocks, or even hundred resource blocks (in FIG. 2, for sake of simplicity, only the single resource block 212 is illustrated).

To mitigate inter-BS interference, it is possible that the particular resources 223 allocated for communication of the positioning reference signals 150 are varied from BS 101-103 to BS 101-103. Thus, different BSs 101-103 may employ different resource mappings (in FIG. 2 only a single resource mapping 301 is shown for simplicity). In one example, each resource mapping 101-103 including resources 223 allocated for transmission of the positioning reference signals 150 may be uniquely allocated to a BS 101-103. For example, the particular resources 223 allocated for communication of the positioning reference signals 150 may depend on a unique identity associated with the transmitting BS 101-103, e.g., the cell ID.

To further reduce the inter-BS interference, certain BSs 101-103 may be configured to alternatingly mute transmission of the positioning reference signals 150 in a time-division multiplexing (TDM) manner. Thus, such techniques enable time-division multiplexing and/or frequency-division (FDM) multiplexing. Alternatively or additionally, it would also be possible to employ code-division multiplexing (CDM) between the plurality of BSs 101-103 transmitting the positioning reference signals. Here, scrambling code can be employed.

To mitigate intra-BS interference and/or inter-BS interference, it is possible that a particular subframe 202 including resources 223 allocated for transmission of the positioning reference signals 150 is a protected subframe 202. For example, the protected subframe 202 may not include resources 223 allocated for transmission of payload data.

Payload data may be data originating from a higher layer of the transmission protocol stack. For example, payload data may be data originating from the application layer according to the OSI model of the transmission protocol stack. Sometimes, payload data is also referred to as user data.

Typically, a higher accuracy may be achieved for determining the position of the mobile device 130 if a larger count of positioning reference signals 150 is communicated from each participating BS 101-103 to the mobile device 130. This is why a plurality of resources 223 are allocated for transmission of the positioning reference signals 150 per subframe 202. For example, the count of resources 223 allocated for transmission of the positioning reference signals 150 with respect to the total count of resources 223 in the subframe 202 may define a time-frequency density of the positioning reference signals 150. The time-frequency density may be defined with respect to a resource block 212 and/or may be defined with respect to the system bandwidth of the wireless channel. Typically, a higher time-frequency density of the positioning reference signals 150 results in a higher accuracy for determining the position of the mobile device 130.

In FIG. 2, a frequency offset 280 between simultaneously communicated positioning reference signals 150 is illustrated. Often, a smaller frequency offset 280 will result in a higher time-frequency density of the positioning reference signals 150.

Figure 3:
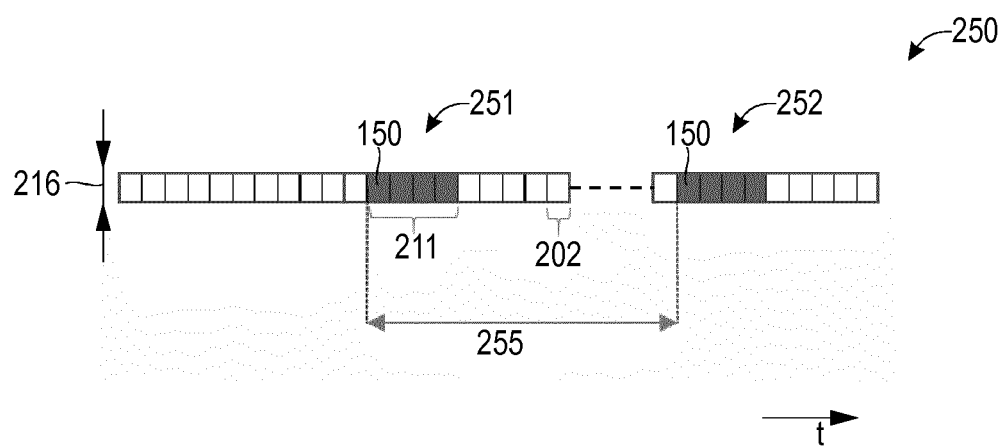
FIG. 3 schematically illustrates a sequence of subframes of the wireless channel comprising a plurality of resources allocated for transmission of DL positioning reference signals, wherein the sequences is repeated according to a timing schedule according to various embodiments.

FIG. 3 schematically illustrates aspects with respect to a repetitive timing schedule 250. The repetitive timing schedule 250 is used for transmission of DL positioning reference signals 150 from a given BS 101-103 to the mobile device 130. Other BSs 101-103 may use the same or different repetitive timing schedule 250. Properties of the repetitive timing schedule 250 may be configured by the network 100 using control signaling, e.g., Radio Resource Control (RRC) signaling and/or Non-Access Stratum (NAS) in the example of 3GPP LTE systems. Alternatively or additionally, properties of the timing schedule 250 may be signaled explicitly or implicitly using OTDOA parameters. For example, the LTE positioning protocol (LPP) as specified in 3GPP TS 36.355 may be used to signal the timing schedule 250. Generally, the OTDOA parameters and/or the timing schedule 250 may be communicated between a server such as a location server and the terminal and/or between the server and the BSs 101-103.

According to the repetitive timing schedule 250, a sequence 211 of subframes 202 is repeatedly transmitted. The sequence 211 includes a plurality of subframes 202 adjacent in time-domain to each other: thus, the sequence is contiguous. Each one of the subframes 202 of the sequence 211 includes at least one positioning reference signal 150 (in FIG. 3, the subframes 202 of the sequence 211 are illustrated with the dark filling). For example, there may be no subframes 202 within the sequence 211 which do not include at least one positioning reference signal 150.

Each subframe 202 of the sequence 211 includes one or more resources 223 being allocated for transmission of positioning reference signals 150. For example, in the scenario of FIG. 3, each one of the four subframes 202 of the sequence 211 may be configured according to the resource mapping 301 is illustrated in FIG. 2.

In the example of FIG. 3, a first repetition 251 of the sequence 211 and a second repetition 252 of the sequence 211 are illustrated. There may be more than two repetitions 251, 252. E.g., the sequence 211 may be repeated infinitely.

For example, the sequence 211 may be repeatedly communicated at a given repetition rate. In some examples, the repetition rate may be periodic. In FIG. 3, a periodicity 255 with which the sequence 211 is repeated is illustrated.

In FIGS. 2 and 3, a bandwidth 216 used for transmission of the positioning reference signals 150 is illustrated. In the example of FIGS. 2 and 3, the bandwidth 216 used for the transmission of the positioning reference signals 150 equals the entire system bandwidth of the wireless channel. In other examples, the bandwidth 216 may cover less than the entire system bandwidth. For example, according to reference implementations of a a 3GPP LTE 20 MHz system, the bandwidth 216 may be. Hence, in some examples, resources 223 of the resource mapping 301 may be allocated for transmission of the positioning reference signals 150 across the entire bandwidth of the wireless channel or a subfraction thereof; in some examples of the techniques described herein, it is possible that the bandwidth 216 used for transmission of the positioning reference signals 150 is smaller than the entire bandwidth of the wireless channel.

If the bandwidth 216 used for transmission of the positioning reference signals 150 is smaller than the entire bandwidth of the wireless channel, it is possible to have different arrangements of the frequency band of the positioning reference signals 150 within the frequency band of the wireless channel. In some examples, the frequency band of the positioning reference signals 150 may be centered within the frequency band of the wireless channel. In some examples, the frequency band of the positioning reference signals 150 may be arranged adjacent to an upper edge or a lower edge of the frequency band of the wireless channel. The frequency band may be defined by upper and lower limits and/or the center point and the frequency bandwidth.

Various techniques described herein are based on the finding that an accuracy of the positioning of the mobile device tends to be lower if the bandwidth 216 is restricted. For example, in the 3GPP LTE technology, the sampling rate of a symbol is dependent upon the bandwidth of the wireless channel. For example, the sampling rate for a system bandwidth of 20 MHz is 30.72 MHz: this is twice the bandwidth of a 10 MHz system bandwidth where the sampling rate is 15.36 MHz. A higher sampling rate typically result in a finer measure of the TOA and hence a more accurate determination of the distance between the respective BS 101-103 and the mobile device 130. Therefore, the accuracy is dependent on the bandwidth. For example, if the positioning reference signals 150 are transmitted using a bandwidth 216 of 1.4 MHz, an accuracy in determining the location of the mobile device 130 according to reference implementations amounts to ±150 meters. For example, if the positioning reference signals 150 are transmitted using a bandwidth 216 of 10 MHz, an accuracy in determining the location of the mobile device 130 according to reference implementations amounts to ±50 meters.

Various techniques described herein are based on the finding that for wireless channels designed for IoT applications, the system bandwidth—and with it the bandwidth 216 for transmission of the positioning reference signals 150—is typically limited. For example, according to 3GPP NB-IoT, the system bandwidth is limited to a single resource block 212 and thus amounts to 180 kHz. For example, according to 3GPP eMTC, the system bandwidth is limited to 6 resource blocks 212 and thus amounts 1.4 MHz. Various examples described herein enable increased accuracy when determining the location of a mobile device in bandwidth-limited wireless channels such as 3GPP NB-IoT and 3GPP eMTC.

Figure 4:
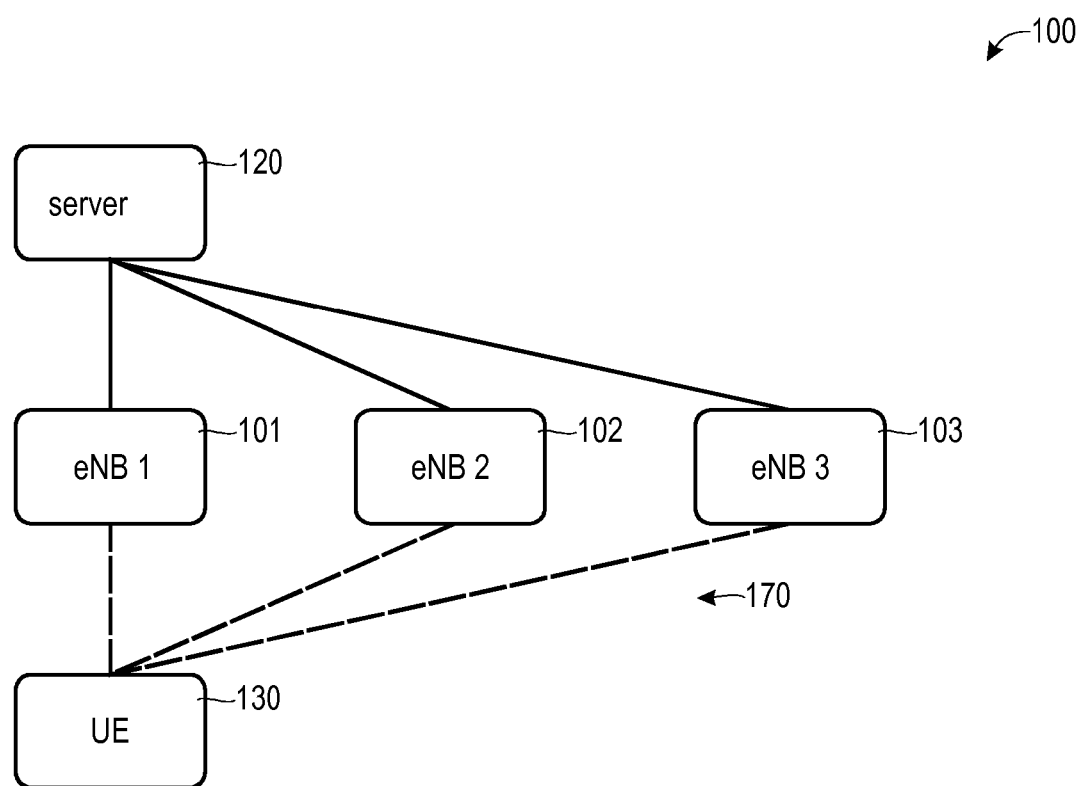
FIG. 4 schematically illustrates the architecture of a cellular network configured for positioning of a mobile device according to various embodiments.

FIG. 4 illustrates aspects with respect to the cellular network 100. In particular, FIG. 4 illustrates aspects of an architecture of the cellular network 100 for positioning the mobile device 130. As illustrated in FIG. 4, the wireless channel 170 facilitates communication between each one of the BSs 101-103 and the mobile device 130.

In FIG. 4, a network node 120 of the cellular network 100 which is implemented by a server is shown. The server 120 may perform various tasks with respect to positioning of the mobile device 130.

A first task that may be assigned to the server 120 may correspond to scheduling of the communication of the positioning reference signals 150. Here, the server 120 may implement the resource mappings specifying the resources 223 allocated for transmission of the positioning reference signals 150 at each one of the BSs 101-103. Different BSs 101-103 may thus be associated with different resource mappings: thus, different BSs 101-103 may employ different resources 223 for transmission of the positioning reference signals 150.

A second task that may be assigned to the server 120 may correspond to implementing the timing schedule for repeated transmission of the sequence 211 of subframes 202 which include the positioning reference signals 150 at each one of the BSs 101-103. Different BSs 101-103 may use different timing schedules, including different repetition rates 255 and/or lengths of the sequences 211.

A third task that may be assigned to the server 120 may correspond to determining location information based on positioning information provided by the mobile device 130. Here, it is possible that the positioning information provided by the mobile device 130 is indicative of a TDOA of the positioning reference signals 150 received from each one of the BSs 101-103 with respect to the positioning reference signals 150 received from a reference BS 101-103. Then, the server 120 can perform triangulation taking into account the positioning information, as well as predefined positions of the BSs 101-103, e.g., defined with respect to the reference BS. Based on the triangulation, the location of the mobile device 130 with respect to the BSs 101-103 may be determined. Then, the location information can be indicative of the determined position of the mobile device 130. This third task may also be executed by a separate location server (not shown in FIG. 4).

Figure 5:
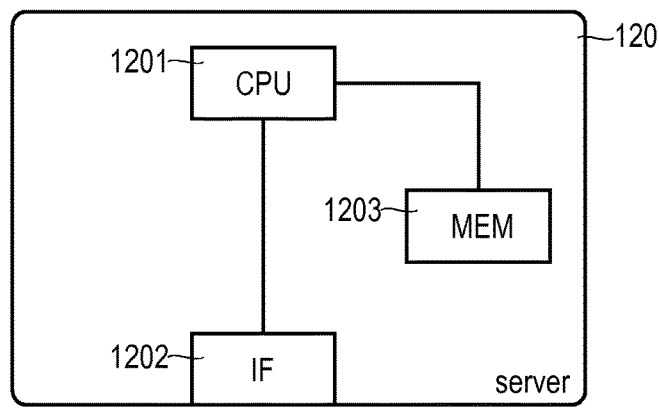
FIG. 5 schematically illustrates a server network node of the cellular network according to various embodiments.

FIG. 5 schematically illustrates aspects with respect to the server 120. The server 120 includes a processor 1201, an interface 1202, and a memory 1203. It is possible that the memory 1203 stores program code that may be executed by the processor 1201. Executing the program code can cause the processor 1201 to perform various tasks with respect to positioning of the mobile device 130. Such tasks may include the scheduling of the communication of the positioning reference signals 150, determining timing schedules for repetitive transmission of sequences of subframes including positioning reference signals 150, as well as the determining of the location information based on positioning information indicative of the TDOAs provided by the mobile device 130. The processor 1201 may exchange messages with the BSs 101-103, as well as with the mobile device 130 via the interface 1202.

Figure 6:
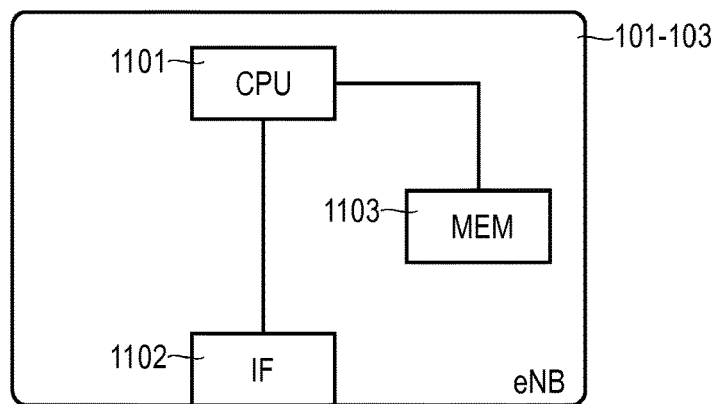
FIG. 6 schematically illustrates a base station of the cellular network according to various embodiments.

FIG. 6 schematically illustrates aspects with respect to the BSs 101-103. The BSs 101-103 each include a processor 1101, an interface 1102, and a memory 1103. It is possible that the memory 1103 stores program code that may be executed by the processor 1101. Executing the program code can cause the processor 1101 to perform various tasks with respect to positioning of the mobile device 130. Such tasks may include communicating the positioning reference signals 150 in accordance with the respective resource mapping which includes resources 223 allocated for transmission of the positioning reference signals 150. Such tasks may further include communicating the positioning reference signals 150 in the sequence 211 of subframes 202. The timing of the sequence 211 of subframes 202 may be defined by the respective timing schedule. Such tasks may further include the encoding of the positioning reference signals 150 according to a certain sequence code. The interface 1102 may be configured to transmit DL signals and receive UL signals via the wireless channel 170.

Figure 7:
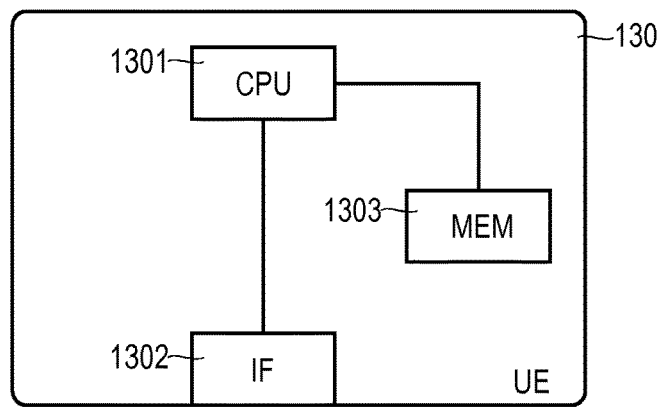
FIG. 7 schematically illustrates a mobile device of the cellular network according to various embodiments.

FIG. 7 schematically illustrates aspects with respect to the mobile device 130. The mobile device 130 includes a processor 1301, an interface 1302, and a memory 1303. It is possible that the memory 1303 stores program code that may be executed by the processor 1301. Executing the program code can cause the processor 1301 to perform various tasks with respect to positioning of the mobile device 130. Such tasks include communicating the positioning reference signals 150 in accordance with the resource mapping which includes resources 223 allocated for transmission of the positioning reference signals 150. The mobile device may receive positioning reference signals 150 from different BSs 101-101; different BSs 101-103 may use different resource mappings. Such tasks may further include communicating the positioning reference signals 150 in the sequence 211 of subframes 202. The timing of the sequence 211 of subframes 202 may be defined by the timing schedule. Again, different BSs 101-103 may use different timing schedules. Such tasks may further include decoding of the positioning reference signals 150 according to a certain sequence code. The interface 1302 may be configured to receive DL signals and transmit UL signals via the wireless channel 170.

Figure 8:
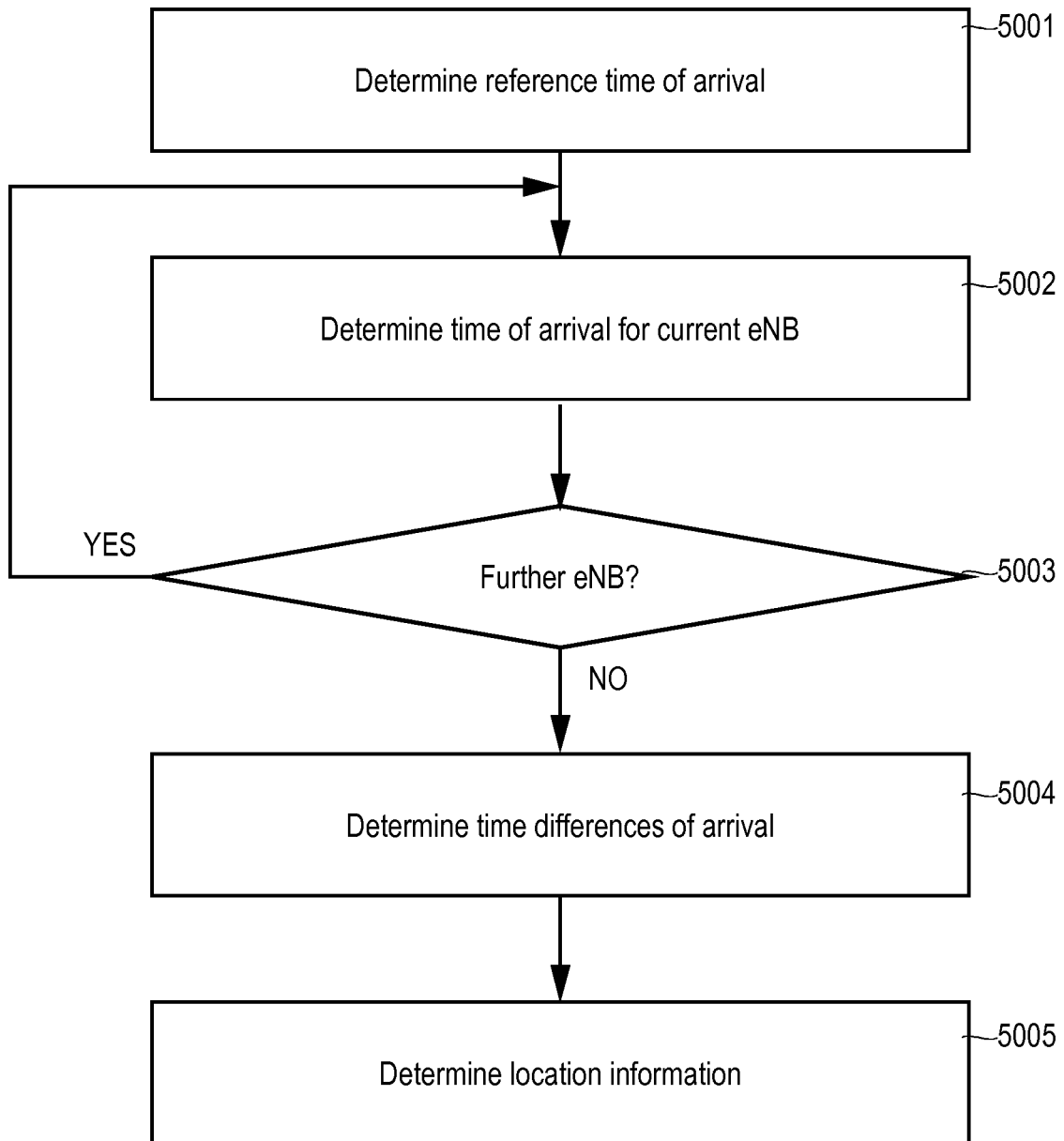
FIG. 8 is a flowchart of a method according to various embodiments.

FIG. 8 is a flowchart of a method according to various examples. The method according to FIG. 8 illustrates various aspects with respect to positioning of the mobile device 130.

First, in block 5001, the reference TOA is determined. For this, the mobile device 130 may receive one or more positioning reference signals 150 from a reference BS 101-103. Then, the mobile device 130 may determine the time-of-flight between the reference BS 101-103 transmitting the one or more positioning reference signals 150 and the mobile device 130 receiving the one or more positioning reference signals 150. From this, the TOA can be derived. Typically, determining the reference TOA is a task which requires significant computational efforts.

Next, in block 5002, the TOA is determined for a given BS 101-103 different from the reference BS 101-103. Again, the mobile device 130 may receive one or more positioning reference signals 150 from the given BS 101-103. Then, the mobile device 130 may determine the time-of-flight between the given BS 101-103 transmitting the one or more positioning reference signals 150 and the mobile device the receiving of the one or more positioning reference signals 150. Again, determining the TOA in block 5002 is a task which requires significant computational efforts.

In block 5003 it is checked whether positioning reference signals 150 are available from a further BS 101-103 different from the reference BS 101-103, as well as different from any BS 101-103 for which previously positioning reference signals in block 5002 have been received and for which previously in block 5002 the TOA has been determined.

If said checking in block 5003 yields that positioning reference signals 150 are available from a further BS 101-103, block 5002 is re-executed anew for said further BS 101-103.

Once the TOA has been determined for all available BSs 101-103 by multiple iterations of block 5002, the method commences in block 5004. In block 5004, the TDOAs are determined. For this, the reference TOA determined in block 5002 may be combined or, generally, set into relationship, with each one of the TOAs for the further BSs 101-103 determined in block 5002.

Typically, the determining of the TDOAs in block 5004 is a task which is executed by the mobile device 130, e.g., by the processor 1301. However, in other example implementations, it would also be possible that the mobile device 130 provides positioning information which is indicative of the TOAs determined in blocks 5001, 5002 to the server 120. Then, block 5004 is a task which can be executed by the server 120, e.g., by the processor 1201, or a location server.

Finally, in block 5005, the location information is determined. The location information specifies the position of the mobile device 130, e.g., in an absolute reference system such as latitude and longitude. The location information in block 5005 is typically determined based on triangulation of the TDOAs determined in block 5004.

Typically, the determining of the location information in block 5005 is a task which is executed by the server 120, e.g., by the processor 1201, or a location server. However, in other example implementations, it would also be possible that the mobile device 130 determines the location information locally.

For example, blocks 5001-5005 may be re-executed for each subframe 202 including the positioning reference signals 150. In other examples, blocks 5001-5004 may be re-executed for each repetition 251, 252 of the sequence including multiple subframes 202, each one of the multiple subframes 202 including positioning reference signals 150 from one or more of the BSs 101-103. Thereby, the location information can be up-to-date and, e.g., the position of the mobile device 130 can be tracked.

Figure 9A:
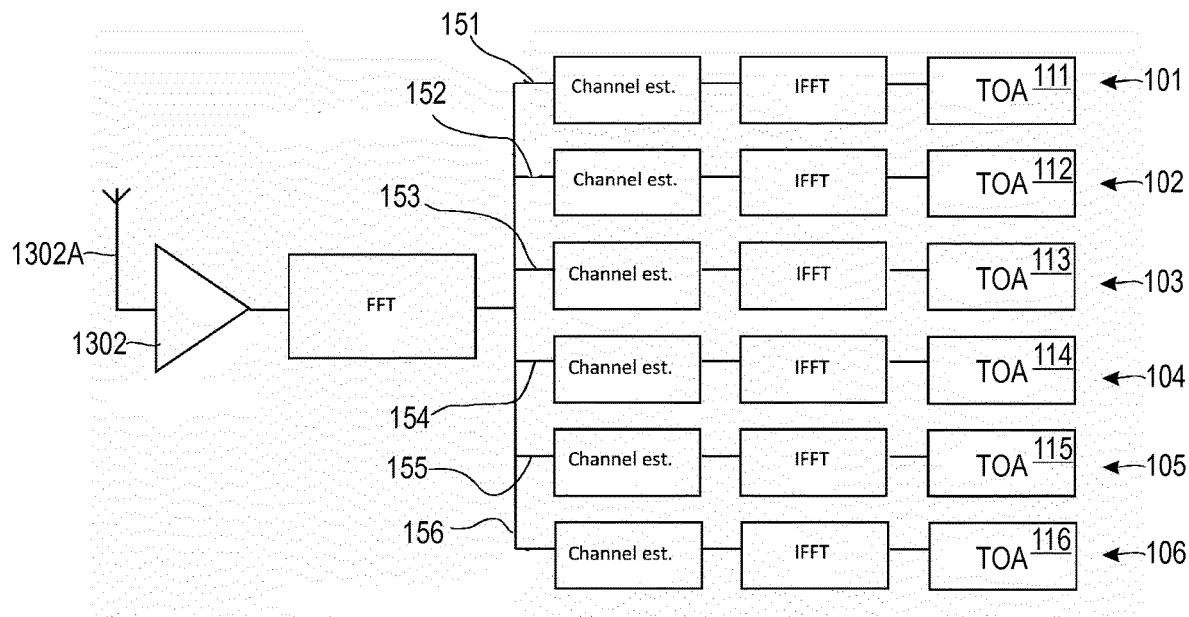
FIG. 9A schematically illustrates determining a time-difference of arrival according to various embodiments.

FIG. 9A illustrates aspects with respect to determining of TOAs 111-116 of positioning reference signals communicated on the wireless channel 170 by different BSs 101-106. In detail, FIG. 9A illustrates an example in which the TOAs 111-116 are determined by the mobile device 130.

In FIG. 9A, an antenna 1302A is coupled with the interface 1302. In the example of FIG. 9A, the interface 1302 implements an analog front end.

The analogue signals received via the wireless channel 170 by the interface 1302 are digitized and transformed into frequency domain. For this, a Fast Fourier Transform (FFT) is applied. The symbols corresponding to the different resources 223 can then be individually post-processed. For example, as illustrated in FIG. 9A, it is possible to implement different processing pipelines for the positioning reference signals 151-156 received from the different BSs 101-106. While in the example of FIG. 9A positioning reference signals 151-156 are received from a count of six BSs 101-106, in other examples, positioning reference signals may be received from a smaller or larger count of BSs.

Each of the pipelines includes a channel estimator. Following channel estimation, each pipeline converts the respective channel estimate into the time domain using an inverted FFT operation. Then, the TOA 911-916 is determined within each pipeline.

Typically, the channel estimation and the inverted FFT require significant computational efforts. For example, processing resources may be required to execute the inverted FFT. Additionally, typically, positioning reference signals 151-156 need to be buffered in the memory 1303. Typically, each received reference signal 151-156 is represented by a floating-point number. Because there may be multiple positioning reference signals 151-156 for each BS 101-106 per subframe 202, this may result in a significant usage of memory resources.

Figure 9B:
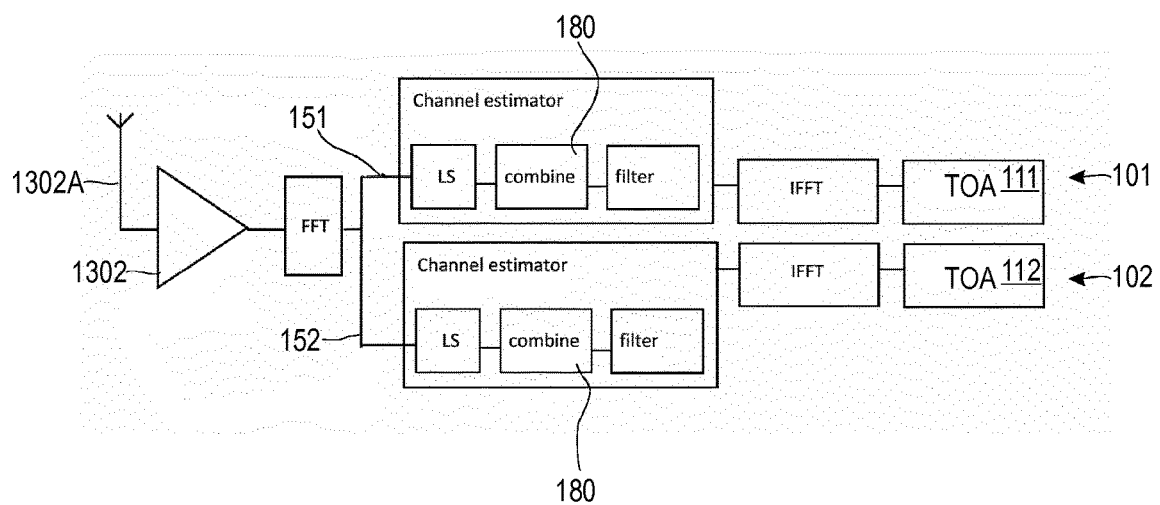
FIG. 9B schematically illustrates determining a time-difference of arrival according to various embodiments.

FIG. 9B illustrates aspects with respect to determining of TOAs 111, 112 of positioning reference signals communicated on the wireless channel 170 by different BSs 101, 102. In detail, FIG. 9B illustrates an example in which the TOAs 111, 112 are determined by the mobile device 130. FIG. 9B generally corresponds to FIG. 9A.

In the example of FIG. 9B, the channel estimators of each pipeline implement combination of a plurality of positioning reference signals 150 received from the respective BS 101, 102. For example, a value can be determined which is indicative of a plurality of positioning reference signals 150 based on a combination of at least some of the positioning reference signals 150 received in the respective sequence of subframes 202. E.g., the symbols of the various positioning reference signals 150 may be summed. Then, the respective TOA 111, 112 can be determined based on the value.

In the example of FIG. 9B, the UE performs least square (LS) channel estimation to obtain the coarse channel weight. The obtained channel weight can be filtered in time and/or frequency domain to obtain finer results (filter in FIG. 9B).

Such techniques relax memory requirements. This is because it is not required to store each received positioning reference signals 150. Rather, it is only required to store the combined value.

Such techniques further increase the signal-to-noise ration. This is because multiple positioning reference signals 150 are combined before determining the TOA. This facilitates coverage enhancement.

Figure 10:
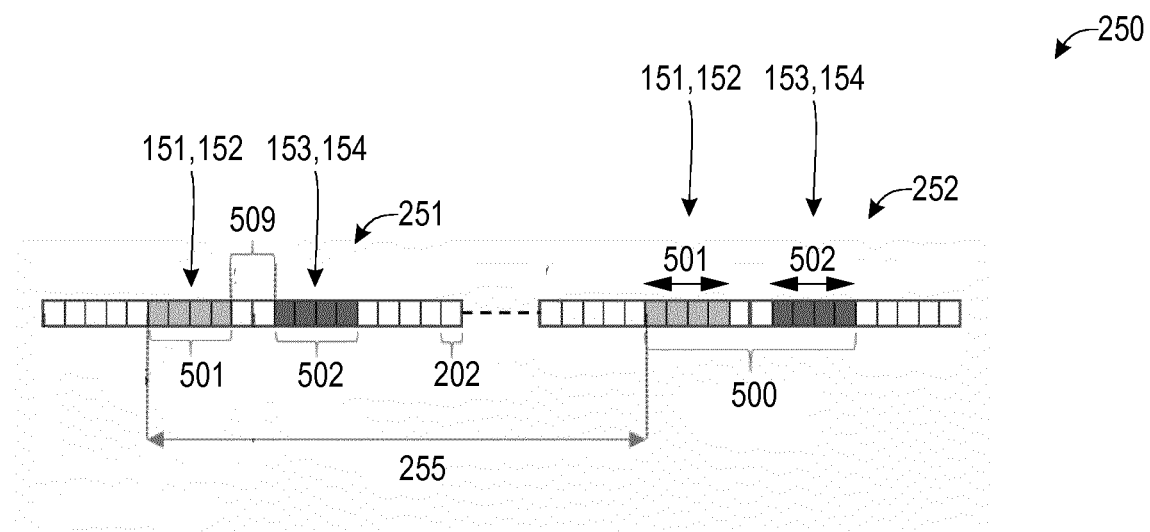
FIG. 10 schematically illustrates a sequence of subframes of the wireless channel comprising a plurality of resources allocated for transmission of DL positioning reference signals, wherein the sequences is repeated according to a timing schedule according to various embodiments.
Figure 10:
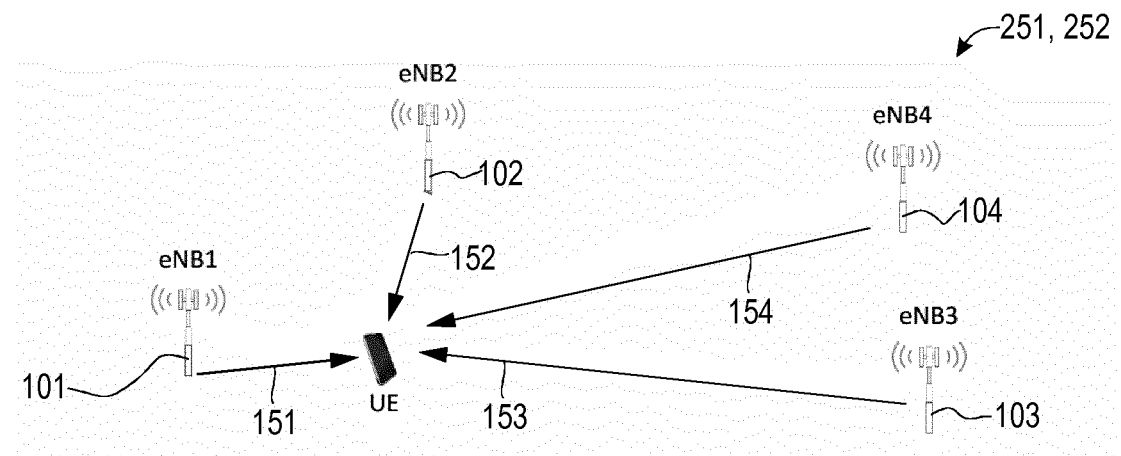

FIG. 10 schematically illustrates aspects with respect to a repetitive timing schedule 250. The timing schedule 250 is used for transmission of DL positioning reference signals 151-154 from each one of the base stations 101-104 to the mobile device 130, respectively. FIG. 10 illustrates aspects with respect to multiple repetitive sequences 501, 502 of the timing schedule 250, each one of the sequences 501, 502 comprising a plurality of subframes 202. In FIG. 10, two repetitions 251, 252 are illustrated, but there may be more repetitions. The repetitions 251, 262 are repeated with a certain repetition rate 255. The repetition rate 255 may be periodic or a-periodic.

The sequence 501 includes subframes 202 including positioning reference signals 151, 152 from the base stations 101, 102, respectively. The sequence 502 includes subframes 202 including positioning reference signals 153, 154 from the base stations 103, 104, respectively.

The mobile device 130 can receive the positioning reference signals 151, 152 in the sequence 501 and can—alternatively or additionally—receive the positioning reference signals 153, 154 in the sequence 502. In one example, the mobile device 130 can determine the TDOA of signals communicated on the wireless channel 170 based on, both, the positioning reference signals 151, 152, as well as based on the positioning reference signals 153, 154. For example, a reference TOA 111 may be determined based on the positioning reference signals 151. Then the TOA 113, 114 determined based on the positioning reference signals 153, 154 may be set into relationship with the reference TOA 111.

In the scenario according to FIG. 10, the computational resources required by the mobile device 130 to determine the TDOAs based on the various positioning reference signals 151-154 is comparably low. This is because reception of the various positioning signals 151-154 required for positioning is stretched out over a longer time duration if compared to a reference implementation where all involves BSs 101-104 transmit during the same subframes 202. The computation load—e.g., processing load and/or memory load—can be stretched out accordingly.

In some examples, it is possible that the mobile device 130 first determines the TOAs 111, 112 based on the positioning reference signals 151, 152; and only once said determining of the TOA 111, 112 based on the positioning reference signals 151, 152 has been completed, proceeds with receiving in determining the TOAs 113, 114 based on the positioning reference signals 153, 154. For example, the mobile device 130 may be configured to determine the TOAs 111, 112 based on the positioning reference signals 151, 152 prior to or at least during the sequence 502. Then, the mobile device 130 can be configured to determine the TOA based on the positioning reference signals 153, 154 after the end of the sequence 501.

Once the TOAs 111-114 have been determined for all positioning reference signals 151-154, the mobile device 130 may determine the TDOA based on the previously determined TOAs 111-114.

Hence, the combination of the sequences 501 and 502 forms a positioning occasion 500. There is one positioning occasion per repetition 251, 252. The complete set of TDOAs is determined based on the positioning reference signals 151-154 received over the entire positioning occasion 500. On the other hand, each individual sequence 501, 502 forms a sub-positioning occasion per repetition 251, 252.

If compared to reference implementation where, e.g., six different base stations transmit positioning reference signals in a sequence of subframes, the memory requirements can also be reduced. For example, the mobile device 130 may be configured to buffer first values indicative of the positioning reference signals 151, 152 received in the sequence 501 and to determine the TOAs 111, 112 based on the first values. Then, the at least one first value can be flushed from the memory; said flushing can occur prior to or during the sequence 502. By flushing the memory, memory space is made available to buffer second values indicative of the positioning reference signals 153, 154 received in the sequence 502. Then, the TOAs 113, 114 can be determined based on the second values. The values may be floating-point numbers, sometimes referred to as soft values. By such a serialized access to the memory 1303, the maximum memory capacity required at any moment in time can be relaxed.

According to such techniques, the receiver architecture of FIG. 9A can be simplified: only two parallel pipelines are required, because—at a given moment in time—only positioning reference signals 151-154 from two BSs 101-104 are processed. The two pipelines can be sequentially re-used for positioning reference signals 151-154 received from different BSs 101-104.

In some examples, the memory requirements can be further relaxed. This may be achieved by implementing a combination of received positioning reference signals 151-154 (cf. FIG. 9B). For example, the mobile device 130 can determine a first value based on a combination of the positioning reference signals 151 received in the sequence 501; the mobile device 130 can further determine a second value based on a combination of the positioning reference signals 152 received in the sequence 501; the mobile device 130 can determine a third value based on a combination of the positioning reference signals 153 received in the sequence 502; and the mobile device 130 can further determine a fourth value based on a combination of the positioning reference signals 154 received in the sequence 502. Based on these values, the respective TOAs 111-114 can then be determined. Other counts of BSs are possible.

By implementing such a combination of corresponding positioning reference signals 151-154, it is furthermore possible to increase the signal-to-noise ratio of each TOA 111-114. Coverage enhancement is possible. Energy can be accumulated across different receptions of corresponding positioning reference signals 151-154.

In the example of FIG. 10, a scenario is illustrated where to base stations 101-104 are grouped into a given sequence 501, 502. The number of base stations 101-104 per sequence can vary. Generally, it can be desirable to limit the number of base stations 101-104 per sequence 501, 502 to, e.g., less than six and/or two to four to, thereby, obtain significant reduction of the computational load imposed on the mobile device 130. In some examples, the number of base stations 101-104 per sequence 501, 502 can be determined flexibly based on the processing power of the mobile device 130. E.g., the mobile device 130 may signal its processing power implicitly or explicitly to the server 120 for this purpose.

While in the example of FIG. 10 a scenario is illustrated with the base stations 101, 102 allocated to the sequence 501 are different from the base stations 103, 104 allocated to the sequence 502, in other scenarios, it would be possible that at least one given base station is allocated to, both, the sequences 501, 502. This may increase the positioning accuracy, because additional positioning occasions are created with respect to positioning reference signal received from the at least one given base station.

In some examples, it is not required that the mobile device 130 receives all available positioning reference signals 151-154 across all sequences 501, 502. E.g., it would be possible that the mobile device 130 selects one or more sequences from a plurality of sequences. Then, the mobile device 130 may selectively receive only those positioning reference signals communicated in the selected one or more sequences. This may further reduce the computational load imposed on the mobile device 130, because the amount of data to be processed is reduced.

To implement the timing schedule 250 of the sequences 501, 502, it is possible that the server 120 sends corresponding control messages to the base stations 101-104. The control message can be indicative of the sequences 501, 502. E.g., the control message can specify the repetition rate 255, the lengths of each sequence 501, 502, etc.

Such techniques facilitate synchronization of the timing schedule 250 for the various base stations. In particular, by such time-synchronization of the timing schedule 250 across the involved base stations 101-104, it is possible to tailor the timing between the sequences 501, 502. The timing can be such that the TDOAs determined for the various positioning reference signals are meaningful in the context of positioning: in particular, a longer timing offset 509 between the sequences 501, 502 tends to reduce the accuracy of the positioning, because the mobile device 130 can have moved in-between and/or channel properties of the wireless channel 170 can have changed. On the other hand, if the timing offset 509 is too short, benefits in terms of reduced computational burden imposed on the mobile device 130 can be limited. Thus, the timing of the sequences 501, 502 with respect to each other may be tailored in view of the trade-off situation.

Different strategies of grouping the various participating base stations 101-104 into the different sequences 501, 502 are conceivable. E.g., the grouping may be based on the positions of the base stations 101-104, e.g., in a global reference system or with respect to each other. It is also possible that the grouping is based on the distance between the various base stations 101-104 and the mobile device 130. Because a-priori the position of the mobile device 130 may not be know at a high accuracy, the position of the mobile device 130 may be approximated. This may be done based on knowledge of the serving base station 101-104 of the mobile device 130.

E.g., the network node may determine the various sub-positioning occasions into which the participating base stations 101-104 are grouped based on knowledge of the serving cell of the mobile device 130 and/or the positions of the base stations 101-104. The knowledge of the serving cell of the mobile device 130 provides an approximate position of the mobile 130 device; e.g., from this, a distance between the mobile device 130 and the various base stations 101-104 can be approximated.

In the example of FIG. 10, the mobile device 130 is served by the base station 101. The distance between the base station 101 and the base station 102 is small; while the distance between base station 101 and each one of base stations 104, 103 is large. On the other hand, the distance between base stations 103, 104 is small. Then, the server 120 can send a control message instructing the various base stations 101-104 to implement the timing schedule 250 according to FIG. 10: here, the base stations 101, 102 are grouped into the first sub-positioning occasion corresponding to the sequence 501, while the base stations 103, 104 are grouped into the second sub-positioning occasion corresponding to the sequence 502. Such a scenario may be feasible in particular if the positioning reference signals 151-154 are specifically addressed to the mobile device 130, i.e., if the positioning reference signals 151-154 are mobile device-specific. In such a scenario, the cellular network 100, e.g., the server 120, may configure the timing schedule 250 in response to a corresponding positioning request received from the mobile device 130.

By grouping the base stations 101-104 based on the distance between the mobile device 130 and the base stations 101-104, the time offset between simultaneously transmitted positioning reference signals 151-154 at the receiver can be reduced. For example, due to the longer propagation delay between the base stations 103, 104 and the mobile device 130, the positioning reference signals 153, 154 have a longer time-of-flight if compared to the positioning reference signals 151, 152 transmitted by the close a base stations 101, 102. If the time offset is not contained within the cyclic prefix of a resource preceding the symbol of the resource, the positioning reference signals can lose their orthogonality and thereby degrade the overall reception quality. By a grouping strategy is illustrated in FIG. 10, the time offset of the positioning reference signals 111-114 within each sequence 501, 502 can be limited.

Generally, grouping of the base stations 101-104 with respect to the various sequences 501, 502 can be based on the characteristics of the various base stations 101-104. Different decision criteria can be used in different example implementations. Grouping is not limited to the positions of the base stations 101-104 and/or the distances between the base stations 101-104 and the mobile device 130.

Figure 11:
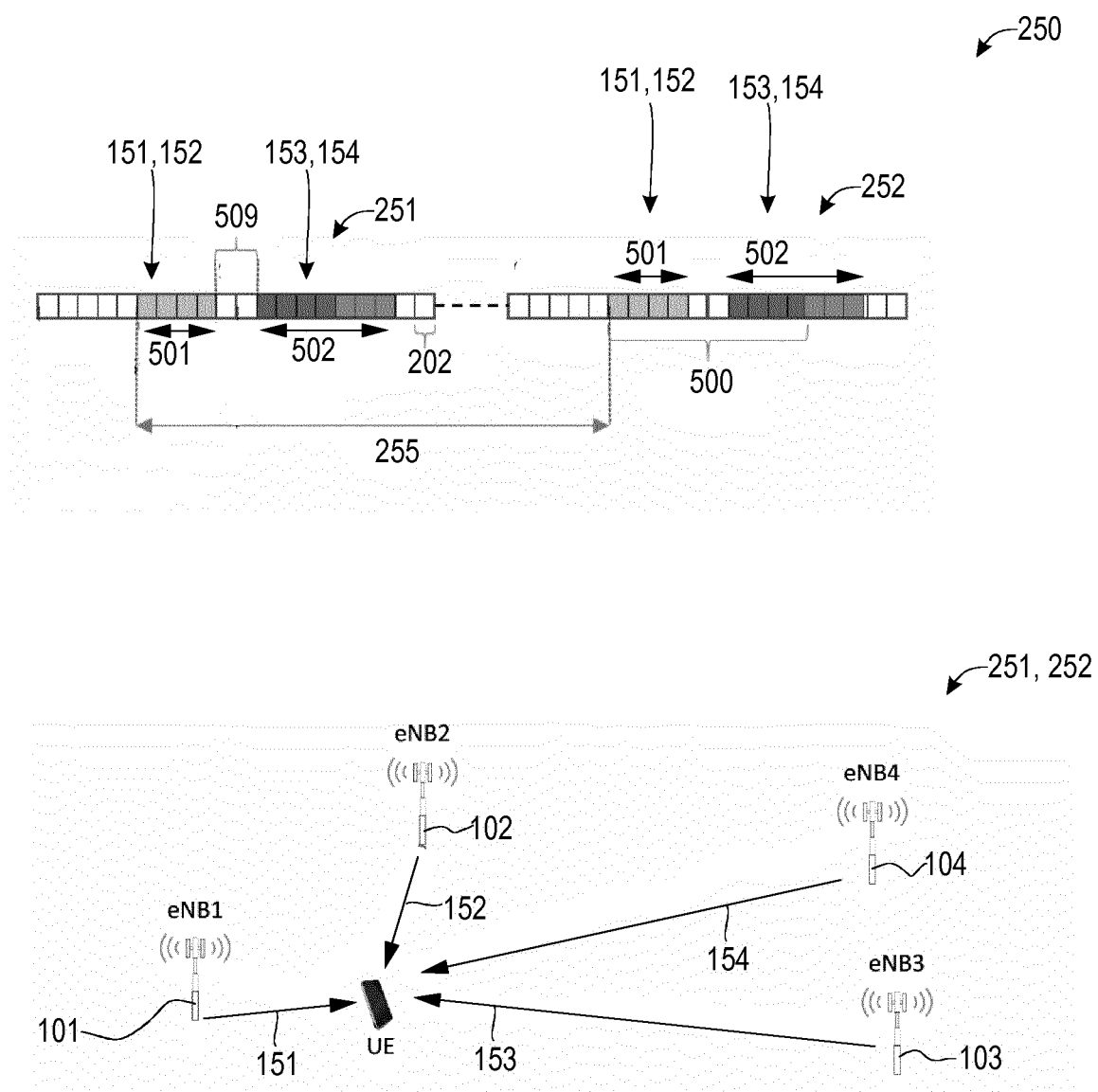
FIG. 11 schematically illustrates a sequence of subframes of the wireless channel comprising a plurality of resources allocated for transmission of DL positioning reference signals, wherein the sequences is repeated according to a timing schedule according to various embodiments.

FIG. 11 schematically illustrates aspects with respect to a repetitive timing schedule 250. The repetitive timing schedule 250 is used for transmission of DL positioning reference signals 151-154 from the base stations 101-104 to the mobile device 130, respectively. FIG. 11 generally corresponds to FIG. 10.

In the scenario of FIG. 11, the base stations 101, 102 are grouped into the sequence 501. The sequence 501 is, thus, associated with base stations 101, 102 which have a comparably small distance to the mobile device 130. Differently, the base stations 103, 104 are grouped into the sequence 502. The sequence 502 is, thus, associated with base stations 103, 104 which have a comparably large distance to the mobile device 130.

In the example of FIG. 11, the length of the sequences 501, 502 is determined based on the distance between the mobile device 130 and the associated base stations 101-104: To facilitate accumulation of sufficient energy by combination of respective positioning reference signals 153, 154, the length of the sequence 502 is longer if compared to the length of the sequence 501. This allows to compensate for the lower receive power expected for the positioning reference signals 153, 154 if compared to the positioning reference signals 151, 152. This compensates for increased path loss of the positioning reference signals 153, 154.

Figure 12:
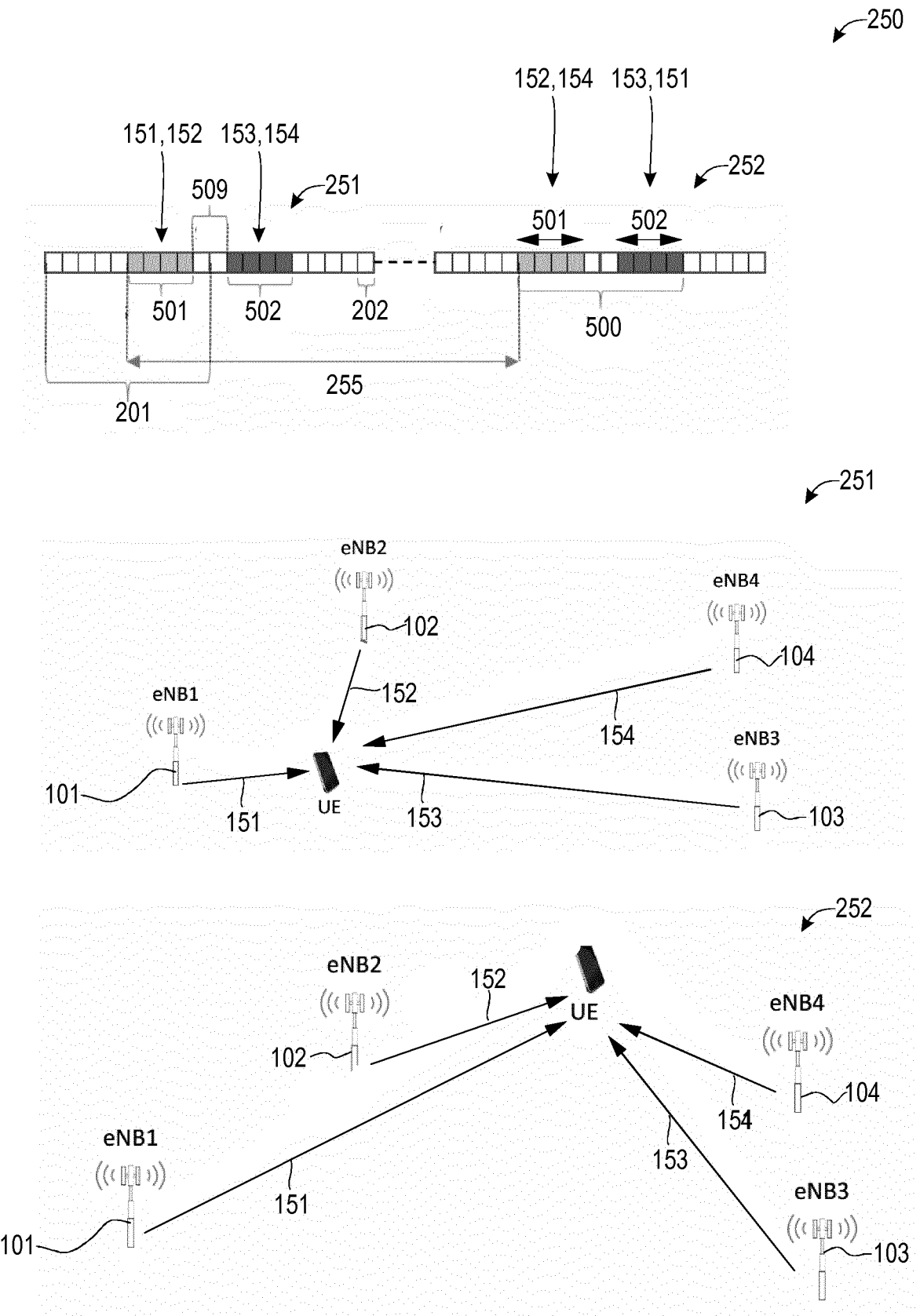
FIG. 12 schematically illustrates a sequence of subframes of the wireless channel comprising a plurality of resources allocated for transmission of DL positioning reference signals, wherein the sequences is repeated according to a timing schedule according to various embodiments.

FIG. 12 schematically illustrates aspects with respect to a repetitive timing schedule 250. The repetitive timing schedule 250 is used for transmission of DL positioning reference signals 151-154 from the base stations 101-104 to the mobile device 130, respectively. FIG. 12 illustrates aspects with respect to multiple repetitive sequences 501, 502, each one of the multiple repetitive sequences 501, 502 comprising a plurality of subframes 202. The example of FIG. 12 generally corresponds to the example of FIG. 10.

However, in the example of FIG. 12, the distances between the various base stations 101-104 and the mobile device 130 change between the repetitions 251, 252. Because the grouping of the base stations 101-104 may depend on the distance between the mobile device and the base stations 101-104, the grouping changes between the repetitions 251, 252. In the example of FIG. 12, grouping of base stations 101-104 with respect to the sequences 501, 502 in the first repetition 251 corresponds to the grouping according to the example of FIG. 10. Then, the distance between the mobile device 130 and the base stations 102, 104 changes and becomes shorter than the distance between the mobile device 130 and the base stations 101, 103 for the second repetition 252. Because of this, the grouping is changed and the sequence 501, for the second repetition 252, is associated with the base stations 102, 104.

Generally, it is possible that the association between base stations 101-104 and sequences 501, 502 is flexibly changed. Hence, a given base station 101, 102 may be allocated to the sequence 501 during the first repetition 251 and allocated to the sequence 502 during the second repetition 252. Thus, the grouping of base stations 101-104 may change in-between subsequent repetitions 251, 252. This allows to flexibly address changes in the system.

While in the example of FIG. 12 a scenario is illustrated where the grouping of the base stations 101-104 changes in-between subsequent repetitions 251, 252 of the timing schedule 250, in other examples, such techniques may be applied to changes of the grouping of the base stations 101-104 within a given repetition 251, 252.

Above, various examples have been described where the grouping of the various base stations 101-104 into the different sequences 501, 502 depends on their position and/or distance from the mobile device 130. However, in other examples, other decision criteria for said grouping can be considered alternatively or additionally. For example, it would be possible that the grouping of the various base stations 101-104 is repeatedly altered according to some predefined scheme. For example, the grouping may be altered by cyclically shifting the associations of the various base stations 101-104 with the sequences 501, 504. Such scenarios may be helpful if knowledge on the position of the various base stations 101-104 and/or knowledge on the position of the mobile device 130 is not available. Furthermore, such scenarios may be helpful if knowledge on an approximate position of the mobile device 130, e.g., in order to determine the distance between the base stations 101-104 and the mobile device 130, is not available.

If knowledge on an approximate position of the mobile device 130 is not available to the network 100, it would be possible that the mobile device 130 autonomously determines that in repetition 252 it is closer to the base stations 102, 104 if compared to base stations 101, 103. This may be done based on receive power measurements and/or based on neighbor cell lists. Then, the mobile device 130 can select the sequence 501 during the repetition 252, i.e., selectively receive the positioning reference signals 152, 154.

In the examples of FIGS. 10-12, the sequences 501, 502 have a timing offset 509 from each other corresponding to at least one gap transmission frame 202. The timing offset 509 is defined in the framework of the repetitive timing schedule 250 and may be configured accordingly via control signaling by the network 100.

In the examples of FIGS. 10-12, two gap transmission frames 202 are provided. In general, it would be possible that the timing offset 509 is restricted to a single gap transmission frame or includes more than the gap transmission frames. The duration of the timing offset 509 may vary.

By provisioning the timing offset 509, processing of the positioning reference signals 151-154 received during the preceding sequence 501 can be facilitated. In particular, a safety margin is provided subsequent to the sequence 501 by means of the timing offset 509 such that the mobile device 130 can determine the TOA 111-114 for the positioning reference signals 151-154 received during the preceding sequence 501 before the beginning of the succeeding sequence 502.

To avoid further occupation of the processing power of the mobile device 130 during the timing offset 509, it is possible that the gap transmission frames 202 do not include data and/or signals addressed to the mobile device 130. In particular, the gap transmission frames 202 may not include any positioning reference signals 151-154 addressed to the mobile device 130. Therefore, the mobile device 130 may be relieved from processing any incoming data or signals during the timing offset 509: this facilitates determining of the TOA 111-114 for the positioning reference signals received during the preceding sequence 501.

In an example, the duration of the timing offset 509 is not longer than 50 milliseconds, preferably not longer than 10 milliseconds, more preferably not longer than 2 milliseconds. Thereby, the trade-off situation between changes in the position of the mobile device 130 and/or changes in the properties of the wireless channel 170 on the one hand side, and a sufficient timing offset 509 to facilitate determining of the TOA for the positioning reference signals received during the preceding sequence may be tailored.

In particular, the repetition rate 255 of the timing schedule 250 may correspond to a significantly longer time duration between subsequent repetitions 251, 252 than the duration of the timing offset 509. E.g., the repetition rate 255 may be implemented by a periodicity that is longer by at least a factor of 10 then the duration of the timing offset 509, preferably longer by at least a factor of 100, more preferably by at least a factor of 500.

In some examples, it is possible that the duration of the timing offset 509 is flexibly determined based on the processing power of the mobile device 130. E.g., if the processing power of the mobile device 130—e.g., being an eMTC or NB-IoT device—is comparably low, the time duration of the timing offset 509 may be set to a longer value. E.g., the mobile device 130 may signal the processing power to the server 120 for this purpose. Other decision criteria for determining the duration of the timing offset 509 may include the count of positioning reference signals in the preceding sequence and/or the distance between the base stations allocated to the preceding sequence. This allows to dynamically address the above-identified trade-off situation between changes of the channel and changes in the position of the mobile device 130 on the one hand side, and sufficient time for determining the TOA of the positioning reference signals received in the preceding sequence 501.

While in the examples of FIGS. 10-12 only two sequences 501, 502 allocated for transmission of positioning reference signals 151-154 from four different base stations 101-104, in other examples, a larger number of sequences can be provided. E.g., number of 3, 4, 5, etc. sequences can be provided. This may facilitate more accurate positioning of the mobile device 130, because positioning reference signals from a larger number of base stations may be received. Also the count of base stations per sequence may be reduced; thereby the computational load may be further reduced.

In such an example, the timing offsets between different sequences can have different durations. E.g., the duration of the timing offset may be dependent on a count of base stations allocated for transmission of positioning reference signals in the sequence preceding the timing offset. A larger (smaller) count of base stations allocated for transmission of positioning reference signals in the sequence preceding the timing offset may result in a longer (smaller) duration of the timing offset.

It is in particular also possible that the timing offset including gap transmission frames 202 is included after the last sequence 502 of repetition 251, 252. Then, the mobile device 130 may not be required to monitor or decode payload data etc. during the corresponding gap transmission frames. Thereby, complexity of the mobile device 130 may be reduced such that it does not have to simultaneously process TOA measurements and transmission including payload data.

Generally, the various properties of the timing schedule 250 can be explicitly or implicitly signaled to the mobile device 130. For example, the properties of the timing schedule 250 may include the count of subframes 202 per sequence 501, 502, the repetition rate 255, the count of base stations 101-104 per sequence 501, 502, and/or the duration of the timing offset 509, etc. In one example, it is possible that such properties of the timing schedule 250 are implicitly determined based on OTDOA parameters. The OTDOA parameters may be used to configure the information related to positioning of the mobile device 130 such as the list of base stations 101-104 that should be measured by the mobile device 130 for positioning, etc. For example, if the number of base stations 101-104 that should be measured by the mobile device 130 is M, then the mobile device 130 can determine that the number of sequences 501, 502 is M/2. Here, the mobile device 130 may determine—e.g., from predefined specifications—that, at most, two base stations 101-104 are allocated to one and the same sequence 501, 502.

Figure 13:
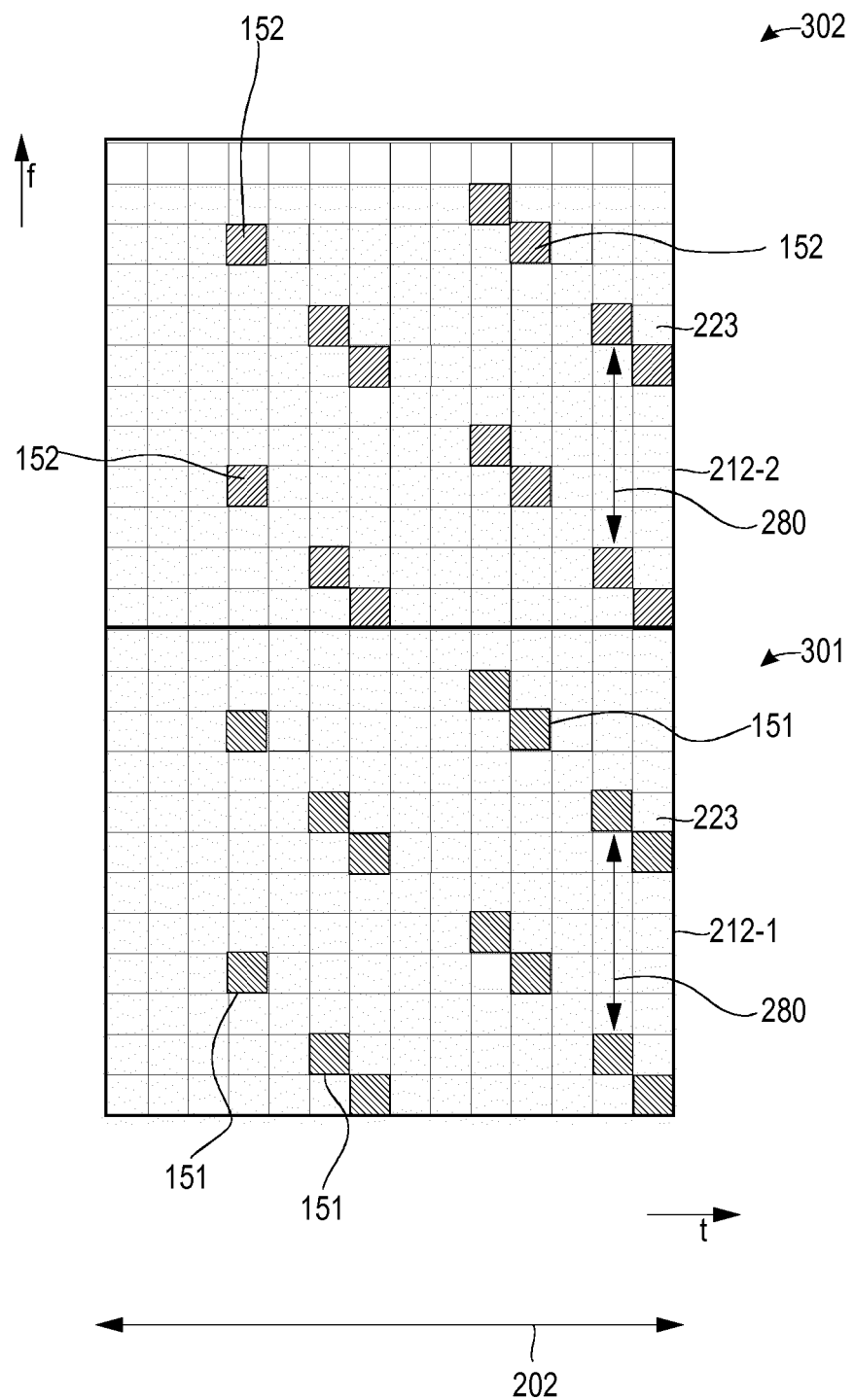
FIG. 13 schematically illustrates a resource mapping of a subframe of a wireless channel comprising a plurality of resources allocated for transmission of DL positioning reference signals according to various embodiments.

FIG. 13 illustrates a resource mapping 301 used for the transmission of positioning reference signals 151 from the base station 101 to the mobile device 130. FIG. 13 further illustrates a resource mapping 302 used for the transmission of the positioning reference signals 152 from the base station 102 to the mobile device 130.

In the example of FIG. 13, resources 223 allocated for transmission of the positioning reference signals 151 are included in a first resource block 212-1, while resources 223 allocated for transmission of the positioning reference signals 152 are included in a second resource block 212-2. Thereby, FDM is facilitated to avoid inter-cell interference between the multiple base stations 101, 102 simultaneously transmitting the positioning reference signals 151, 152 in the respective subframe 202. In the example of FIG. 13, the frequency bands of the positioning reference signals 151, 152 do not overlap.

In other examples, FDM may also be implemented within a single resource block (not illustrated in FIG. 13). In such an example, the frequency bands of the positioning reference signals 151, 152 would be overlapping. Other techniques of mitigating inter-cell interference may include TDM and CDM. E.g., scrambling code may be used. E.g., muting patterns may be used.

Figure 14:
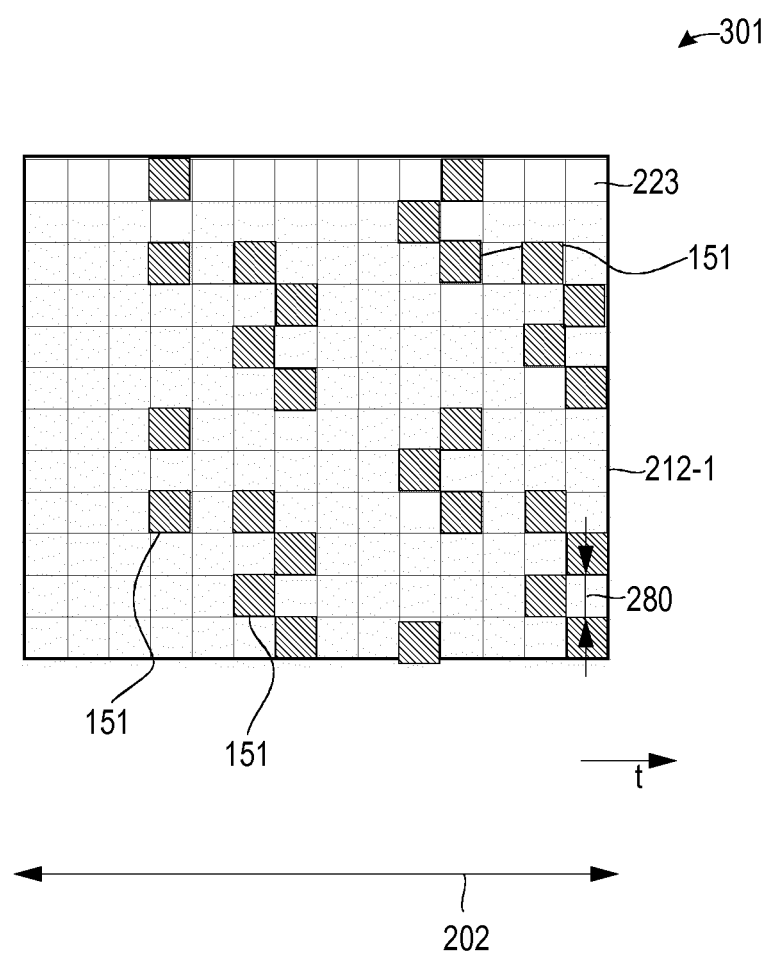
FIG. 14 schematically illustrates a resource mapping of a subframe of a wireless channel comprising a plurality of resources allocated for transmission of DL positioning reference signals according to various embodiments.

FIG. 14 illustrates a resource mapping 301 used for the transmission of positioning reference signals 151 from the base station 101 to the mobile device 130.

In the example of FIG. 14, the time-frequency density of resources 223 allocated for transmission of the positioning reference signals 151 is increased if compared to the example of FIG. 13. In particular, the frequency offset 280 between simultaneously transmitted positioning reference signals 151 is reduced if compared to the scenario of FIG. 13. In the example of FIG. 14, the frequency offset 280 amounts to 2 resources; generally, the frequency offset 280 may be less than 6 resources 223, preferably less than for resources 223.

Such an increased time-frequency density of the positioning reference signals 151 may be applied to some or all of the resource mappings of the various base stations 101-104 participating in the positioning of the mobile device 130.

Such an increased time-frequency density of the positioning reference signals 151 allows to increase the signal quality, e.g., the signal-to-noise ratio, of the received positioning reference signals 151. Thereby, the accuracy with which the TOA 111 can be determined based on the positioning reference signals 151 can be increased.

On the other hand, an increased time-frequency density of the positioning reference signals within the subframe 202 does not necessarily lead to an increase in the complexity of the mobile device 130. In particular, if a combination of multiple positioning reference signals (cf. FIG. 9A) is implemented prior to filtering operations within the channel estimation function, the increased count of positioning reference signals 151 does not increase the overall complexity of the filtering. Typically, the accuracy of such a combination of multiple positioning reference signals into the respective value benefits from a comparably low frequency offset 280.

These techniques are based on the finding that by restricting the count of base stations per sequence 501, 502, it may be possible to increase the count of positioning reference signals of the transmitting base stations using the newly available resources.

Figure 15:
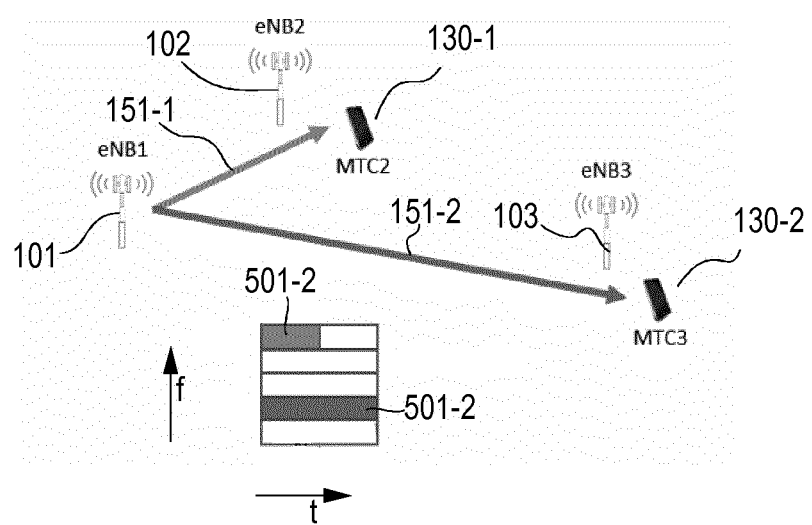
FIG. 15 schematically illustrates transmission of positioning reference signals to different mobile devices according to various embodiments.

FIG. 15 illustrates aspects with respect to the base station 101 transmitting positioning reference signals 151-1, 151-2 to two different mobile devices 130-1, 130-2. In the example of FIG. 15, because the distance between the base station 101 and the mobile device 130-2 is larger than the distance between the base station 101 and the mobile device 130-1, the length of the sequence 501-2 including the positioning reference signals 151-2 addressed to the mobile device 130-2 is longer than the length of the sequence 501-1 including the positioning reference signals 151-1 addressed to the mobile device 130-1. Such an implementation acknowledges that the path loss is expected to be larger for the positioning reference signals 151-2 if compared to the path loss for the positioning reference signals 151-1. In such a scenario, the mobile device 130-2 can benefit from longer repetitions of the positioning reference signals 151-2. This facilitates coverage enhancement.

In the example of FIG. 15, different mobile devices 130-1, 130-2 are associated with different frequency bands. I.e., the frequency band of the various positioning reference signals 151-1, 151-2 is determined based on the mobile device 130-1, 130-2. Thus, the frequency bands may be uniquely allocated to the mobile devices 130-1, 130-2.

While in FIG. 15 a FDM scenario is shown for mitigating interference between the positioning reference signals 151-1, 151-2, in other scenarios, also TDM and/or CDM interference mitigation would be possible alternatively or additionally to FDM.

Furthermore, while in FIG. 15 a scenario is shown where the frequency bands of the positioning reference signals 151-1, 151-2 do not overlap, in other scenarios, the frequency bands of the positioning reference signals 151-1, 151-2 may overlap.

Figure 16:
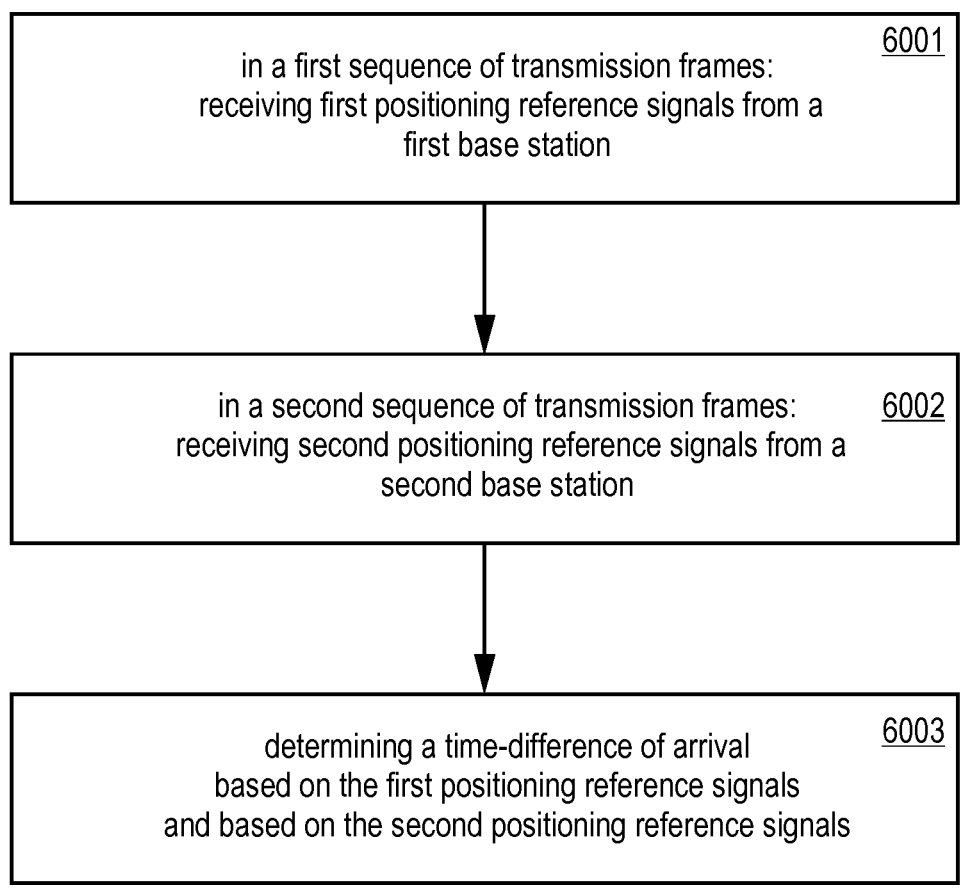
FIG. 16 is a flowchart of a method according to various embodiments.

FIG. 16 is a flowchart of a method according to various examples. At block 6001, first positioning reference signals are received from a first base station in the first sequence of transmission frames.

In block 6002, second positioning reference signals are received from the second base station in the second sequence of transmission frames.

Then, the TDOA is determined based on the first positioning reference signals and based on the second positioning reference signals in block 6003. E.g., the first positioning reference signal may serve as a reference for the second positioning reference signals. E.g., it is possible that a reference TOA is determined based on the first positioning reference signals and that a TOA is determined based on the second positioning reference signals. Then the reference TOA determined based on the first positioning reference signals may be set interrelationship with the TOA determined based on the second positioning reference signals.

FIG. 17 is a flowchart of a method according to various examples. At block 6011, a control message is communicated, e.g., from a network node to a plurality of base stations. The control message is indicative of a first sequence of transmission frames and of a second sequence of transmission frames. A first base station from the plurality of base stations is prompted to transmit first positioning reference signals in the first sequence of transmission frames. A second base station from the plurality of base stations is prompted to transmit second positioning reference signals and the second sequence of transmission frames. The first and second sequences can be at least partly different from each other.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A device, comprising:
an interface configured to communicate on a wireless channel, and
at least one processor configured to receive, in a first sequence of transmission frames of the wireless channel corresponding to a first sub-positioning occasion, first positioning reference signals from a first base station and to receive, in a second sequence of transmission frames corresponding to a second sub-positioning occasion, second positioning reference signals from a second base station, wherein the first sequence corresponding to the first sub-positioning occasion and the second sequence corresponding to the second sub-positioning occasion have a timing offset from each other, wherein the first sequence and the second sequence are received within a same positioning occasion, and are repeated according to a repetitive timing schedule,
wherein the first positioning reference signals are configured to be allocated by the first base station for transmission to the first sequence during a first repetition of the repetitive timing schedule and the first positioning reference signals are configured to be re-allocated by the first base station for transmission to the second sequence during a second repetition of the repetitive timing schedule, and
wherein the at least one processor is further configured to determine a time-difference of arrival of signals communicated on the wireless channel based on the first positioning reference signals and the second positioning reference signals.

2. The device of claim 1,
wherein the at least one processor is configured to determine a first time of arrival based on the first positioning reference signals prior to or during the second sequence,
wherein the at least one processor is configured to determine a second time of arrival based on the second positioning reference signals after the first sequence,
wherein the at least one processor is configured to determine the time-difference of arrival based on the first time of arrival and the second time of arrival.

3. The device of claim 2, further comprising:
a memory coupled with the at least one processor,
wherein the at least one processor is configured to buffer at least one first value indicative of the first positioning reference signals in the memory and to determine the first time of arrival based on the at least one first value,
wherein the at least one processor is configured to flush the at least one first value from the memory prior to or during the second sequence,
wherein the at least one processor is configured to buffer at least one second value indicative of the second positioning reference signals in the memory and to determine the second time of arrival based on the at least one second value.

4. The device of claim 2,
wherein the at least one processor is configured to determine at least one first value indicative of the first positioning reference signals based on a combination of at least some of the first positioning reference signals and to determine the first time of arrival based on the at least one first value, and/or
wherein the at least one processor is configured to determine at least one second value indicative of the second positioning reference signals based on a combination of at least some of the second positioning reference signals and to determine the second time of arrival based on the at least one second value.

5. The device of claim 1,
wherein the duration of the timing offset is not longer than 50 milliseconds.

6. The device of claim 1,
wherein a repetition rate of the timing schedule corresponds to a time duration between subsequent repetitions which is longer than the duration of the timing offset by at least a factor of 10.

7. The device of claim 1,
wherein the at least one processor is configured to determine the duration of timing offset based on at least one of a processing power of the device, the distance between the first base station and the device, and a count of the first positioning reference signals in the first sequence.

8. The device of claim 1,
wherein the length of the first sequence is different from the length of the second sequence.

9. The device of claim 1,
wherein less than six first base stations are allocated for transmission of the first positioning reference signals in the first sequence,
wherein less than six second base stations are allocated for transmission of the second positioning reference signals in the second sequence,
wherein the first base stations are at least partially different from the second base stations.

10. The device of claim 1,
wherein the second base station is allocated for transmission of the second positioning reference signals to the second sequence during the first repetition of the repetitive timing schedule and the second base station is re-allocated for transmission of the second positioning reference signals to the first sequence during the second repetition of the repetitive timing schedule.

11. The device of claim 1,
wherein the first sequence is associated with a first resource mapping of orthogonal time-frequency resources,
wherein a frequency offset between simultaneously communicated first positioning reference signals is less than six resources.

12. The device of claim 1,
wherein the second sequence is followed by at least one gap transmission frame not comprising data addressed to the device.

13. A method, comprising:
in a first sequence of transmission frames corresponding to a first sub-position occasion: receiving first positioning reference signals from a first base station,
in a second sequence of transmission frames corresponding to a second sub-position occasion: receiving second positioning reference signals from a second base station, wherein the first sequence corresponding to the first sub-positioning occasion and the second sequence corresponding to the second sub-positioning occasion have a timing offset from each other, wherein the first sequence and the second sequence are received within a same positioning occasion, and are repeated according to a repetitive timing schedule, and
wherein the first positioning reference signals are allocated by the first base station for transmission to the first sequence during a first repetition of the repetitive timing schedule and the first positioning reference signals are re-allocated by the first base station for transmission to the second sequence during a second repetition of the repetitive timing schedule, and
determining a time-difference of arrival of signals communicated on a wireless channel based on the first positioning reference signals and the second positioning reference signals.

14. A device, comprising:
an interface configured to communicate on a wireless channel, and
at least one processor configured to receive, in a first sequence of transmission frames of the wireless channel, first positioning reference signals from a first base station and to receive, in a second sequence of transmission frames which is at least partly different from the first sequence, second positioning reference signals from a second base station, wherein the first sequence and the second sequence are received within a same positioning occasion, and are repeated according to a repetitive timing schedule,
wherein the first positioning reference signals are configured to be allocated by the first base station for transmission to the first sequence during a first repetition of the repetitive timing schedule and the first positioning reference signals are configured to be re-allocated by the first base station for transmission to the second sequence during a second repetition of the repetitive timing schedule, and/or
wherein the second positioning reference signals are configured to be allocated by the second base station for transmission to the second sequence during the first repetition of the repetitive timing schedule and the second positioning reference signals are configured to be re-allocated by the second base station for transmission to the first sequence during the second repetition of the repetitive timing schedule; and
wherein the at least one processor is further configured to determine a time-difference of arrival of signals communicated on the wireless channel based on the first positioning reference signals and the second positioning reference signals.

* * * * *